US006938388B2

(12) United States Patent
Bayer

(10) Patent No.: US 6,938,388 B2
(45) Date of Patent: Sep. 6, 2005

(54) STRAIGHT CONNECTION PIECE FOR HOLLOW PROFILES WHICH ARE USED AS SPACERS FOR INSULATION GLASS PANES

(75) Inventor: Franz Bayer, Elzach (DE)

(73) Assignee: Bayer Isolierglas- und Maschinentechnik GmbH, Elzach (DE)

( * ) Notice: Subject to any disclaimer, the term of this patent is extended or adjusted under 35 U.S.C. 154(b) by 46 days.

(21) Appl. No.: 10/362,692

(22) PCT Filed: Aug. 17, 2001

(86) PCT No.: PCT/EP01/09482

§ 371 (c)(1),
(2), (4) Date: Feb. 26, 2003

(87) PCT Pub. No.: WO02/20931

PCT Pub. Date: Mar. 14, 2002

(65) Prior Publication Data

US 2003/0202844 A1 Oct. 30, 2003

(30) Foreign Application Priority Data

Aug. 26, 2000 (DE) ........................................ 100 42 047

(51) Int. Cl.[7] .................................................. F16B 7/00

(52) U.S. Cl. .................... 52/656.9; 52/786.13; 403/292

(58) Field of Search ........................... 52/786.13, 787.1, 52/790.1, 726.1, 656.9; 403/298, 297, 292

(56) References Cited

U.S. PATENT DOCUMENTS 4,608,802 A 9/1986 Bayer
5,560,731 A * 10/1996 Kronenberg ................ 403/298
6,764,247 B1 * 7/2004 Kronenberg ................ 403/292

FOREIGN PATENT DOCUMENTS

DE 88 05 575.2 8/1988
EP 0 110 295 A2 6/1984
EP 0 330 906 A 9/1989

* cited by examiner

*Primary Examiner*—Brian E. Glessner
(74) *Attorney, Agent, or Firm*—Volpe and Koenig, P.C.

(57) ABSTRACT

A straight connection piece or connector (1) is used to form a spacer frame or spacer for insulated glass panes. The cross-section of the straight connection pieces (1) fits into the inner hollow section of the hollow profile (2) and the shape and contour of the connection piece corresponds to the hollow profile, at least in parts, in order to partially support and reinforce the hollow profile (2) from the inside in the area of the point of insertion. A recess (4) is provided on the back of the connection piece (1) that faces towards the outer transverse crosspiece (3) of the hollow profile (2) in the in-use position, in its central area. The recess extends over both sides of the point of insertion in the hollow profiles (2). The ends of the outer transverse crosspiece (3) of the hollow profile (2) that face each other can be deformed into the recess.

17 Claims, 15 Drawing Sheets

1
2
3
4
5
7
8
18
21
22
23

1
4
9
10
10(16)
16
17
23

1
2
3
4
7
9
10
19
21
32

1
2
3
4
6
9
10
19
20
21
32

STRAIGHT CONNECTION PIECE FOR HOLLOW PROFILES WHICH ARE USED AS SPACERS FOR INSULATION GLASS PANES

BACKGROUND

The invention pertains to a straight connection piece that is partially inserted, approximately half-way, into hollow profiles that are connected together end-to-end, said hollow profiles being used to form a spacer frame or spacer for insulated glass panes, wherein the cross section of the straight connector fits into the inner hollow section of the hollow profile and approximately corresponds to it at least in areas, with a centered recess on the back of the connector that faces the outer crosspiece of the hollow profile in the installed position, with the ends of the outer crosspiece of the hollow profiles that face each being deformable inwardly into the recess.

A straight connector of this type is known from EP 0 133 655 B2 and from EP 0 330 906 B1 and has been shown to be particularly useful with regard to the mutual alignment of the hollow profiles or hollow profile parts to be connected. The recess at the back of this prior art straight connector has a minimal depth and is bordered at its lateral ledges by a raised area. Furthermore, inside the recess is a projecting flat spacer so that the depth at this point of the recess is further reduced. This recess, then, only allows a minimal compression using the outer crosspiece of the hollow profiles to be connected. In order to nevertheless create a sealed abutment of the hollow profiles at the point of connection, the known straight connectors have projecting stops that hold the ends of the hollow profiles to be connected at a distance. This is intended to facilitate the penetration of sealant into the seams. This makes the formation of a sealed point of connection of the hollow profiles dependent on sufficient sealant being provided in this area and that it be fed through narrow gaps, which requires very careful procedures.

From DE 32 43 692 A1, a straight connector is known of this type that is formed from individual pieces. In the direction of longitudinal extension, this straight connector has an uninterrupted piece without a recess at its side that faces an inner crosspiece of the hollow profiles in its installed position, said uninterrupted piece forming a U-shaped cross section together with side pieces. Therefore, the narrow sides of the U-sides of this straight connector face the outer crosspiece of the hollow profiles. Inside the U-cross section are crosspieces that are at a distance to one another at the center of the straight connector so that each of the outer crosspieces of the hollow profile can be bent inward into the interior of the straight connector somewhat, provided that this is permitted by the side pieces of the hollow profile in this area. This allows the outer crosspiece of the hollow profile to be pressed only minimally inward in this case as well, whereby a narrow opening arises between the outside ends of the crosspieces of these hollow profiles through which to allow seal material. At the side facing the inner cross section, this straight connector also has a spacer to produce a peripheral seam at the point of abutment between the hollow profiles to be connected. Thus, it is difficult to produce a good and secure seal of the points of abutment of the hollow profiles to be connected. Therefore, the danger arises in pushing in the hollow profiles that the side pieces will bulge outward so that the dimensional stability, which is absolutely required in order to maintain a separation between two parallel panes of an insulating window, is not ensured. The common inward pushing of the outside of the hollow profile against the resistance of the outside pieces can even somewhat push the hollow profiles to be connected away from one another, under certain circumstances.

SUMMARY

Thus, the object is to create a straight connector of the type mentioned above that enables the precise deformation, at the point of connection, of the outside pieces of the hollow profiles to be connected in such a manner that a solid connection results and that the ends of the hollow profiles are pulled together, whereby at the same time a good seal can be attained. In this manner, it should be possible to push the outside pieces of the hollow profiles inward at the point of abutment without the danger that the side pieces bulge outward, thus compromising their sealing surfaces. Overall, the ability to form a sealed abutment of the hollow profiles to be connected should be improved.

This object is met in that the recess runs across the entire width at the back of the straight connector and is open toward the outside crosspiece of the hollow profile in its installed position, that this recess is narrow and bordered by steep sides of pieces that lead up to it or by steep walls or perpendicular leading edges of an opening, and that the ends of the outside crosspieces facing one another of the hollow profile to be connected are bent inward-into the recess after the deformation and are plastically lengthened or deep drawn.

A recess of this type that runs across the entire width and in particular is open to the sides makes it possible to deform the outside crosspieces of the hollow profiles to be connected inward into the recess from the installed position and to bend them correspondingly narrowly and angularly around the sharp borders of the recess and also to somewhat pull them inward into the recess in the process, i.e. to effect a deep drawing of them, which can also pull together and solidly press together the two ends of the hollow profiles to be connected. Since the recess is open toward the outsides, at least parts of the side pieces can also be pulled inward into this recess so that they do not bulge, but contribute to the fastening of the two hollow profiles at the straight connector. By bending around the sharp edges and through the deep drawing process, this results in a shape-locked connection that could withstand considerably higher forces than normally occur in a spacer or the like for insulating glass panes during use.

The voids that form at the outer crosspieces of the hollow profiles via deep drawing can be filled in either beforehand or afterward with sealant, whereby the extension across the entire width of the straight connector results in a correspondingly void-free fill with sealant, extending up to the side pieces and thus resulting in a good seal.

A preferred embodiment of the straight connector according to the invention provides that parallel side walls are located at its back that extend up to the recess, which in particular is located in the center, that border cavities located on both sides of the recess at the back. This saves on weight and also allows the outer crosspieces of the hollow profiles to be connected to be deformed adjacent to the actual point of connection so as to improve their mechanical fastening.

Furthermore, it is possible that the cavities continue on into the recess and form a continuous channel at the back of the straight connector that is closed in the installed position by the hollow profile, and that the cavities and the recess have a greater depth than that which corresponds to the reach-in of the deformed crosspieces at the ends of the hollow profiles. Of course, the bending around sharp edges and the deep drawing of the crosspieces occurs in this case only at the parallel side pieces that run in the longitudinal direction of extension, but this is still sufficient to cause the effects already explained of pulling together the two hollow profiles to be connected. At the same time, a channel remains open inside the straight connector that can be filled with desiccant or that allows desiccant to pass through the connection point as well during filling. This allows hollow profiles to already be connected to the straight connector before the bending into a frame begins and before a last connection point is closed using a straight connector. Thus, hollow profiles can be produced that are practically infinite in length using the straight connector so as to then bend them into spacer frames of various sizes.

The edge at the entrance to the recess of the straight connector can be approximately at a right angle or even an acute angle, and the borders of the recess that face one another can run parallel with respect to one another and at approximately a right angle with respect to the longitudinal direction in which the straight connector extends. Thus, the side walls that extend up to the recess and constituting it across a portion of the width, or walls that run across the entire width, or a recess made in the back of the straight connector, have a steep, approximately right-angled ledge at which the outer crosspieces of the hollow profiles to be connected can be correspondingly bent and at a sharp angle and deep drawn despite a relatively narrow recess.

If the connection between the straight connector according to the invention and the hollow profiles ends by the deep drawing of the outer crosspieces of the hollow profiles at the sharp edges of the recess, sealant can be applied from the outside to the slit-like opening that results just before insertion between the panes of an insulating window, thus preparing a good seal. A seal can be applied right after the attachment of the individual panes to the outside or the back of the hollow profiles, whereby the seal material penetrates into the slit-like opening that results at the point of connection of the hollow profiles, providing a good seal.

The cross section of the straight connector can be made to fit a hollow profile with parallel side pieces and two crosspieces spaced at a distance from one another, wherein somewhat inclined or convex or concave transition pieces are provided between the outer crosspiece and each side piece in the installed position, wherein the depth of the recess corresponds approximately to the cross sectional depth of the hollow profiles that is traversed by the transition pieces or exceeds it—in particular minimally. This also allows the transition pieces to be deformed and bent somewhat inward so that this deformation process at the back of the straight connector does not result in reaction forces at the side pieces of the hollow profile such that they deviate and bulge outward. The outer surfaces thereby remain parallel at these side pieces and maintain their dimensional stability, which is of great importance for a sealed placement of panes of the insulating window at these pieces.

Dependent on the width of the recess that extends in the longitudinal direction of extension of the straight connector is the dimension that the parts of the outer crosspieces of the hollow profile can have that are bent inward or deep drawn. So that they have a sufficiently large dimension to facilitate a correspondingly good effect during the deep drawing and at connection and sealing, it is favorable if the width of the recess in the longitudinal direction of extension of the straight connector is approximately twice as large as its depth. If necessary, the width can also be more than twice the depth so that the parts of the outer crosspieces of the hollow profile that bend inward also find enough space. As already mentioned, deep drawing at the steep and ideally sharp-edged borders of the recess prevents the side pieces from buckling or bulging outward since the sinking of the material into the recess along with its sufficient depth exerts a strong pull on the material and can even result in creep. The material of the hollow profiles is thus pulled into the recess, this process continuing up to the transition pieces as well so that an outward bulging to the sides is prevented.

To properly align the ends of the hollow profiles to be connected that are pressed together, it is favorable if at least one ramp is provided in the direction of flow of the respective hollow profile just in front of the recess, said ramp ending at the entrance into the recess and then dropping at an acute angle into the recess. This results in a cross sectional enlargement of the straight connector near these ramps, by means of which the respective hollow profile is forced into a desired position relative to the straight connector and thus with respect to the other hollow profile. Since these ramps are placed just in front of the recess, they are thus located on the back of the straight connector containing the recess and each of them cooperates with the crosspieces of the hollow profile located on the outside in the installed position.

An embodiment of the straight connector according to the invention for a further improvement of the mutual alignment of the hollow profiles provides that there are ramps on the bottom facing away from the recess, said ramps extending up to a center groove, and that the bottom groove holds a cutting ridge present at the ends of the hollow profiles to be connected in the installed position. When the hollow profiles are cut into sections, there in general arises a cutting ridge that runs toward the center of the hollow profile, primarily at the cross piece that faces the inside of the insulating glass pane in the installed position. This fact can be utilized by means of the measure mentioned to improve the shape-locking of the two hollow profiles using the straight connector and at the same time to accommodate this frequently disruptive ridge at the straight connector in the process without compromising the seamless connection of the ends of the hollow profiles due to subsequent deformations. At the same time, these ramps located at the bottom or at the lower side of the straight connector provide an additional alignment of the hollow profiles relative to one another and provide good clamping action, which also results in an automatic centering of the profiles. In other words, when a hollow profile is pushed onto the straight connector or, vice versa, when the straight connector piece is inserted into a hollow profile, the resistance offered by the ramps increases more and more so that when the hollow profiles are pushed onto both sides they find their way to approximately the middle of the straight connector practically automatically, where the cutting ridge can then come to rest.

The ramps at the top and/or the bottom of the straight connector, whose respective inclines are in opposite directions, can be laterally offset from one another with respect to the longitudinal centerline of the straight connector. Thus, the ramps are asymmetric with respect to the centerline so that one ramp on one side can become a stop for the hollow profile pushed onto the other side, and vice versa. This can be provided both on the outside or upper side as well as on the bottom or inside of the straight connector so that the centering of the hollow profiles is further improved.

For straight connectors whose recess on the back is bordered on both sides by continuous walls, it is ideal if these walls have at least one notch or similar opening at their upper ledge that runs in the longitudinal direction of extension of the straight connector, said notch forming a ventilation opening in conjunction with the hollow profile placed on it. If the recess is filled subsequently with a sealant or seal material, and if this material penetrates behind the deep drawn parts of the outside crosspieces, air that is located there can be displaced and kept from preventing the sealant from penetrating. In the same manner, sealant that is already located at the straight connector prior to the deep drawing of the outer crosspieces can better seep out and be displaced into joints, corners and narrow voids without being held back due to air pockets. At the same time, the air pockets that compromise the seal over time can be prevented altogether.

As already mentioned, it is possible that at least the recess is filled with a sealant at least in areas and that the ledges of the outer crosspieces of the hollow profiles to be connected can be pressed into this sealant as they are deep drawn. The deep drawing of the crosspieces can therefore be utilized to compress a sealant provided ahead of time in the straight connector so that it creeps into voids and under the deformed parts of the hollow profile, providing the best possible filling of the free cross sectional areas with sealant. The deep drawing process used to pull together the ends of the hollow profiles to be connected and to solidly connect them using the straight connector can thus be utilized in this case at the same time to press sealant inward into gaps and voids and to effect the best possible distribution of this sealant.

An embodiment of the straight connector, in particular one containing a filling of plastically elastic sealant ahead of time in its recess, is comprised of the recess having a flat extension at the narrow sides of the straight connector into which sealant can move from the center recess to the area of the side pieces, at least when the hollow profiles are compressed together. As already mentioned, the process of compressing and deep drawing of the outer crosspieces can be utilized to distribute sealant that had been applied ahead of time to the straight connector. With the flat continuations mentioned at the narrow sides of the straight connector, sealant can thus be pressed deliberately into this area of the side pieces so that these areas are also well sealed, wherein this sealing process accompanies the compression, deep drawing and connection, and does not require its own process step.

In yet another embodiment of this concept, at least one channel leading to the bottom side can be provided at the bottom of the recess and in particular a flat crevasse can be provided at the bottom into which the channel feeds. This permits the transport of plastically elastic sealant, which was placed ahead of time at the straight connector in the recess, to the bottom of the straight connector facing away from the recess and between this bottom and the inside crosspiece of the hollow profiles in the installed position as a result of the deformation and deep draw process. This allows the sealant to be distributed along the entire periphery of the straight connector at the point of abutment of the two hollow profiles, primarily when combining these measures, and allows for a good seal. Thereby, the sealant can also penetrate into the smallest of seams between the straight connector and the pieces of the hollow profile that are created by any deviations of manufacturing tolerances.

However, it is also possible that at the floor of the straight connector the crevasse extending across the entire width of the straight connector is sufficient to ensure the distribution of the sealant in any case.

It is preferred that at least one channel is provided at each foot of the walls that border the recess, said channel leading to a bottom-side crevasse. This pushes the sealant, which is also placed under pressure along the walls that border the recess when deep drawing, into corresponding channels and moves it to the bottom-side crevasse.

The straight connector can be made of metal or die cast material or of hard plastic, or can be made of a stamped and bent sheet metal part. All of these materials and manufacturing methods make it possible to provide on the back of this straight connector the recess according to the invention into which the outside crosspieces of the hollow profiles that form a spacer or spacer frame for insulating glass panes can be deformed inward and deep drawn.

A straight connector made of sheet metal can have a U-shaped cross section that is made to fit into the inside cross section of the hollow profile and the U-crosspiece of the sheet metal part can contain the recess, which in particular is stamped out. This allows a very simple straight connector to be bent from sheet metal in which the recess is provided through stamping or other forming process, which at the same time can have the already mentioned sharp-edged ledge. This results in a very simple straight connector in which the recess can run across the entire width, that the width is smaller near the outside crosspiece than at the inside crosspiece, which is made possible by the transition pieces with an inclined cross section.

The U-cross section is filled with a gasket between its sides, for example a foam gasket insert, on its side facing away from the recess, at least in an area that extends beyond the recess toward both sides, and in particular a plastic-elastic sealant placed between the U-crosspiece with its recess and this gasket. This results in a good seal when deep drawing at this point despite the cross section having the shape of an open U directed inward, while at the same time displacing the plastic elastic sealant as a result of the deep drawing process, said sealant being able to fill out any seams and voids located in the area of abutment, as already described.

An advantage that applies to practically all of the exemplary embodiments can be seen in that a crevasse is formed by the deep drawing of the area of the outside crosspieces of the hollow profiles near the point of abutment to be connected, said crevasse being well filled with sealant or when an insulating glass pane is sealed with a seal material, and then providing in this area of the point of abutment for an correspondingly larger cross sectional thickness of the seal material. Thus, a thicker layer of seal material results at this point of abutment as a result of the deep drawing of the outside crosspieces, which can be utilized to dimension the thickness of the peripheral seal material as a whole smaller since the generally required thickness of the seal layer is still attained in the area of abutment.

A process to connect the ends of two hollow profiles or to connect a hollow profile that is bent into a spacer frame, by means of a straight connector that is inserted into the ends to be connected, in particular approximately half way, whereupon the ends of the hollow profile to be connected are deformed and compressed together at least at their outside such that a shape lock occurs with the straight connector, can be provided to meet the objective of producing as seal-tight and dimensionally stable a connection as possible in that the crosspieces of the ends of the hollow profiles facing one another that form the outer sides of the hollow profile are both deformed, and thereby deep drawn in their deformation zone, at the same time into a recess that runs across the entire width of the straight connector. This allows the connection of the two hollow profiles to be made at their ends very simply in that a section of the straight connector is inserted into each hollow profile, or the hollow profiles are pushed onto the straight connector so that they both come to rest at the recess located in the center of the connector. Then, for example, the point of abutment can be deep drawn in the manner described using a punch from the outside, which even better pulls the two hollow profiles together due to the flow of the material and due to the tensile force exerted on the material, and which prevents outward bulging in the side areas.

It is especially preferred if the ledges of the crosspieces that face one another of the hollow profiles to be connected are bent around sharp edges at the ledge of the recess and are deep drawn in the process. This results in sharp-edged deformations at the crosspieces in the end areas facing one another that favor the pulling together of the two hollow profiles.

The crosspieces to be deformed can each be bent around the walls and deep drawn at their ledge, with the walls laterally bordering a channel that extends along the outside or the back of the straight connector. In the process, sealant located inside such a channel that forms a recess can be simultaneously compressed together and squeezed into voids, and the air located in these voids can be simultaneously displaced. The channel running along the outside of the straight connector in its longitudinal direction can, however, also be designed such that it also extends across the area of the recess so that when filling with desiccant, the desiccant can pass through the straight connector even after the deep drawing process.

In a different embodiment, the ledges of the outside crosspieces of the hollow profiles to be connected facing one another can be bent around the walls that border the recess of the straight connector on both sides and that extend especially across the entire width of the straight connector, or around leading edges of stamped recesses, and can be deep drawn there.

It is especially suitable if the ends of the outside crosspieces that face one another are pressed into a plastic elastic sealant located in the recess during deep drawing, and if the sealant is thereby displaced behind the bent areas of the crosspieces and/or between the straight connector and the side pieces or between it and the inner crosspiece of the hollow profile that faces away from the area of deformation.

Therefore, the sealant can be provided either just beforehand at the straight connector or it can be injected afterward after connection and in particular after attaching the panes of an insulated glass window.

Regardless of whether sealant is provided in advance or not, a sealing procedure can be done after connection in which the seal material ideally penetrates through the opening formed at the outside at the abutting crosspieces by means of deep drawing, thereby sealing remaining voids. At the same time, an enlarged thickness of the seal material is attained in this area so that a smaller thickness of the seal material is allowed at the overall periphery of a spacer frame of this type, but still achieving a minimum thickness in the area of the joint as required.

It should still be mentioned that the ends of the crosspieces—when connecting using the straight connector—can be deep drawn far enough that the distance resulting and/or remaining between them is small and in particular smaller than the dimension of the desiccant beads filled or to be filled. This provides on the one hand a sufficient compression and connection of the hollow profiles using the straight connector and on the other hand provides that sealant and/or seal material can penetrate into the hollow profiles and into the straight connector, but that desiccant elements or beads present there cannot exit.

BRIEF DESCRIPTIONS OF THE DRAWINGS

Below, exemplary embodiments of the invention are explained in more detail with the help of the drawings. Shown schematically are:

FIGS. 1 to 24 are an exemplary embodiment of a straight connector according to the invention in which a recess extends along the entire width approximately in the middle of the connector bounded on both sides by steep walls, with various views and sections both by itself as well as in its installed position on the one hand, and with and without the plastically elastic sealant that is inserted into the recess prior to the installation of the connector, FIGS. 25 to 33 are an embodiment of a straight connector according to the invention in which pieces are added that lead up to the center recess and that leave open a straight gap or channel for desiccant between them that also penetrates the recess, FIGS. 34 to 43 illustrate a straight connector according to the invention which is formed from sheet metal and whose cross sectional contour is sized to fit the inner contour of hollow profiles to be connected and which has a U-shaped cross section, wherein the free ledge of both sides of the U is located at the outside or the back and contains the recess that runs in the perpendicular direction, wherein the straight connector can allow desiccant to pass through or can be provided with a plastically elastic sealant that is inserted into the recess prior to the installation of the connector, as well as FIGS. 44 to 48 illustrate an embodiment of a straight connector formed from sheet metal that has a U-shaped cross section, wherein the free ledges of the sides of the U face the inside of a spacer frame and wherein the U-crosspiece is located at the back or at the outside and contains the perpendicular recess and wherein a seal and in particular also a plastically elastic sealant are located at the recess.

Individually:

Figures 1, 2, 3, 4, 5, 6, 7, 8:
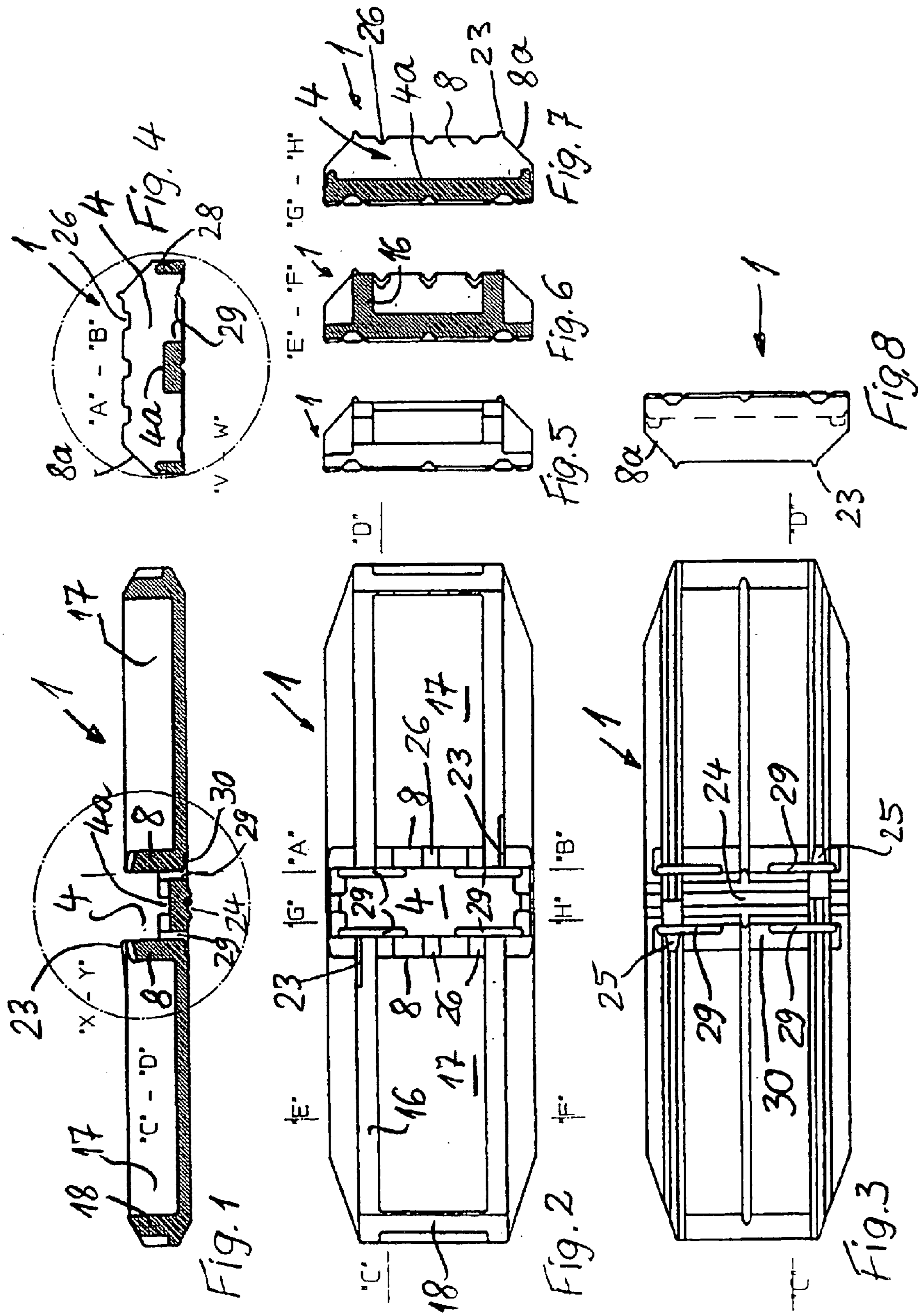
FIG. 1 is a longitudinal section.
FIG. 2 is a top view.
Figure 11:
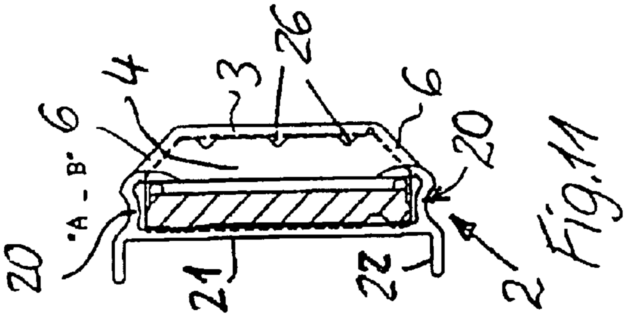
Figure 9:
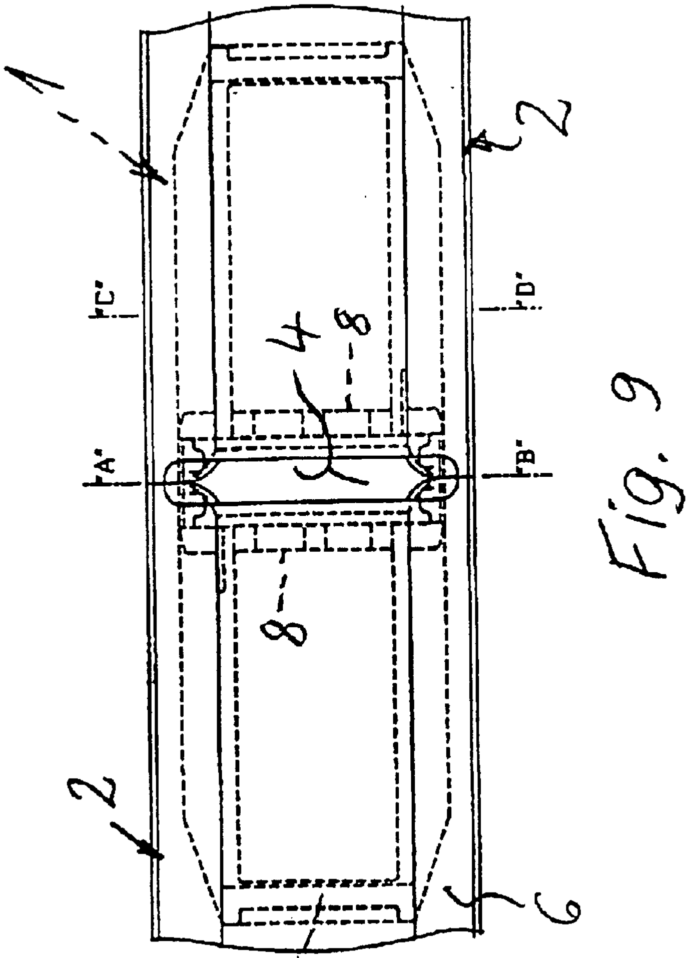
Figure 10:
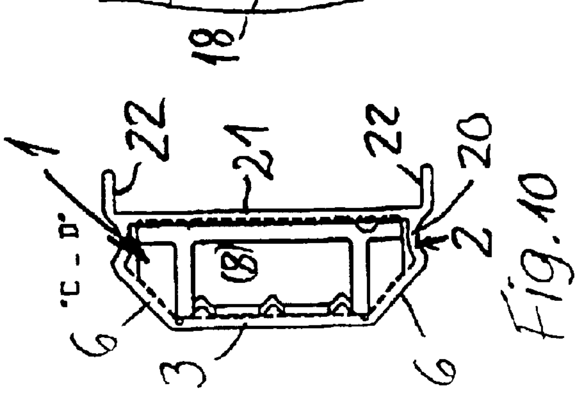
Figures 12, 13, 14:
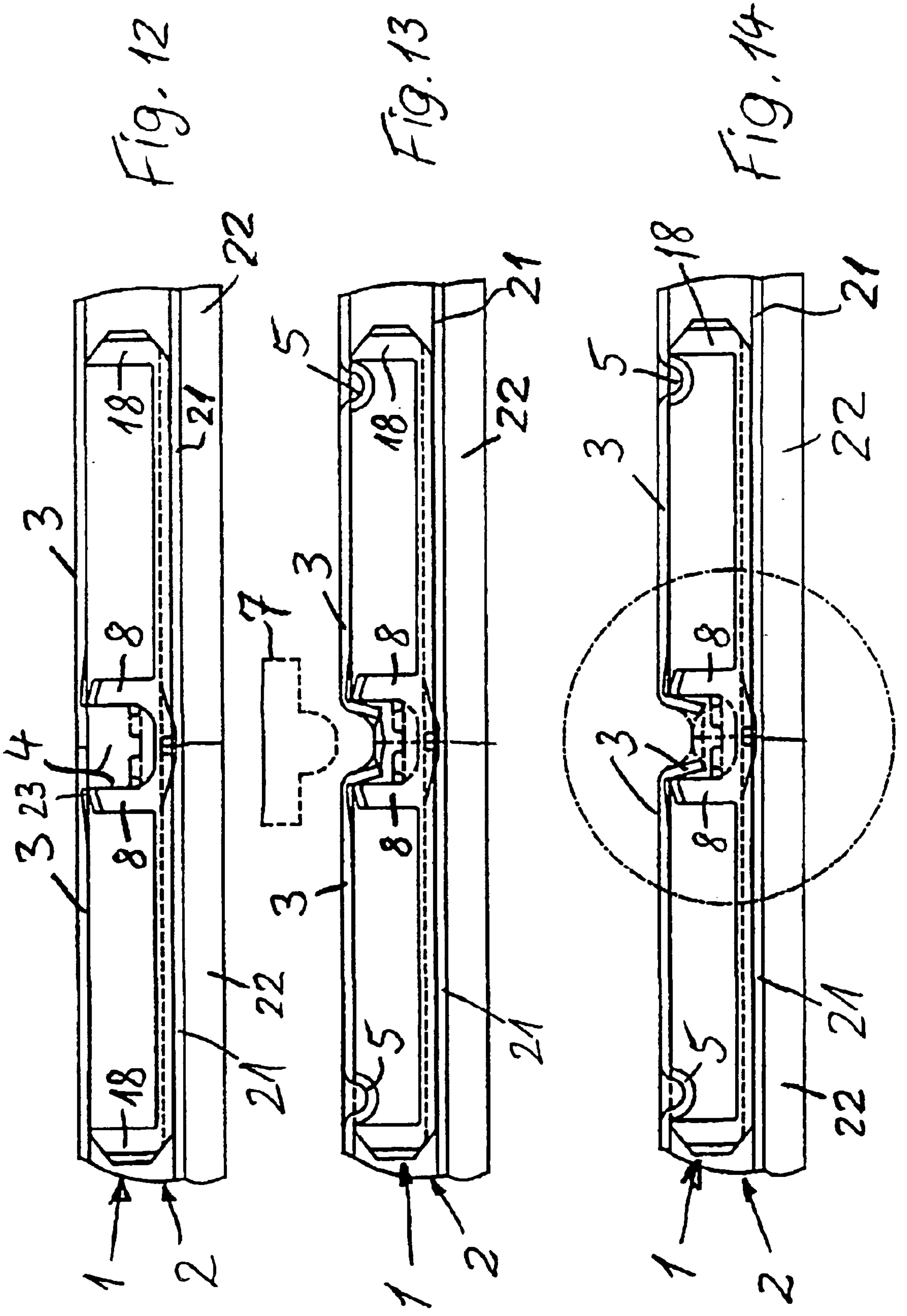
Figure 15:
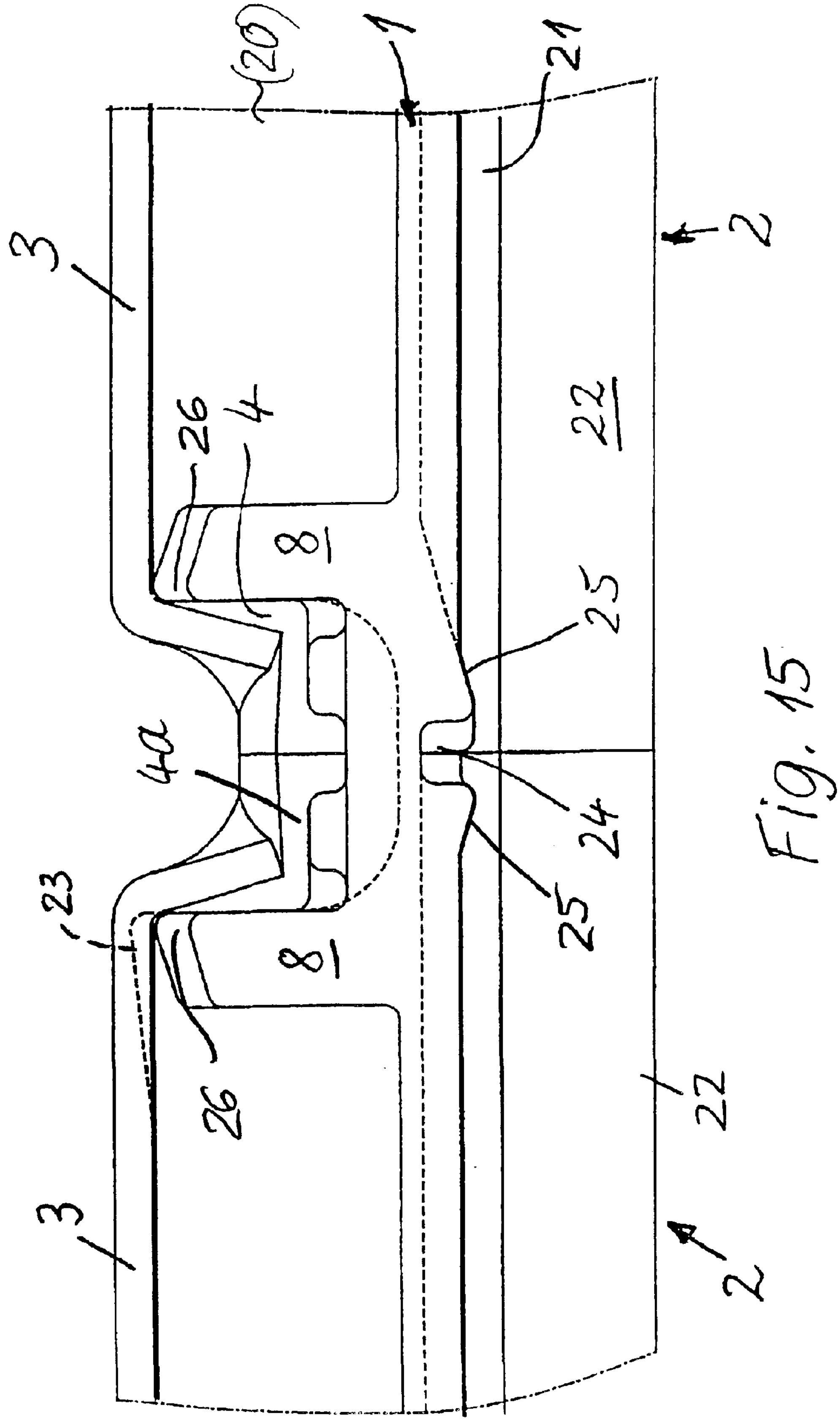
Figure 16:
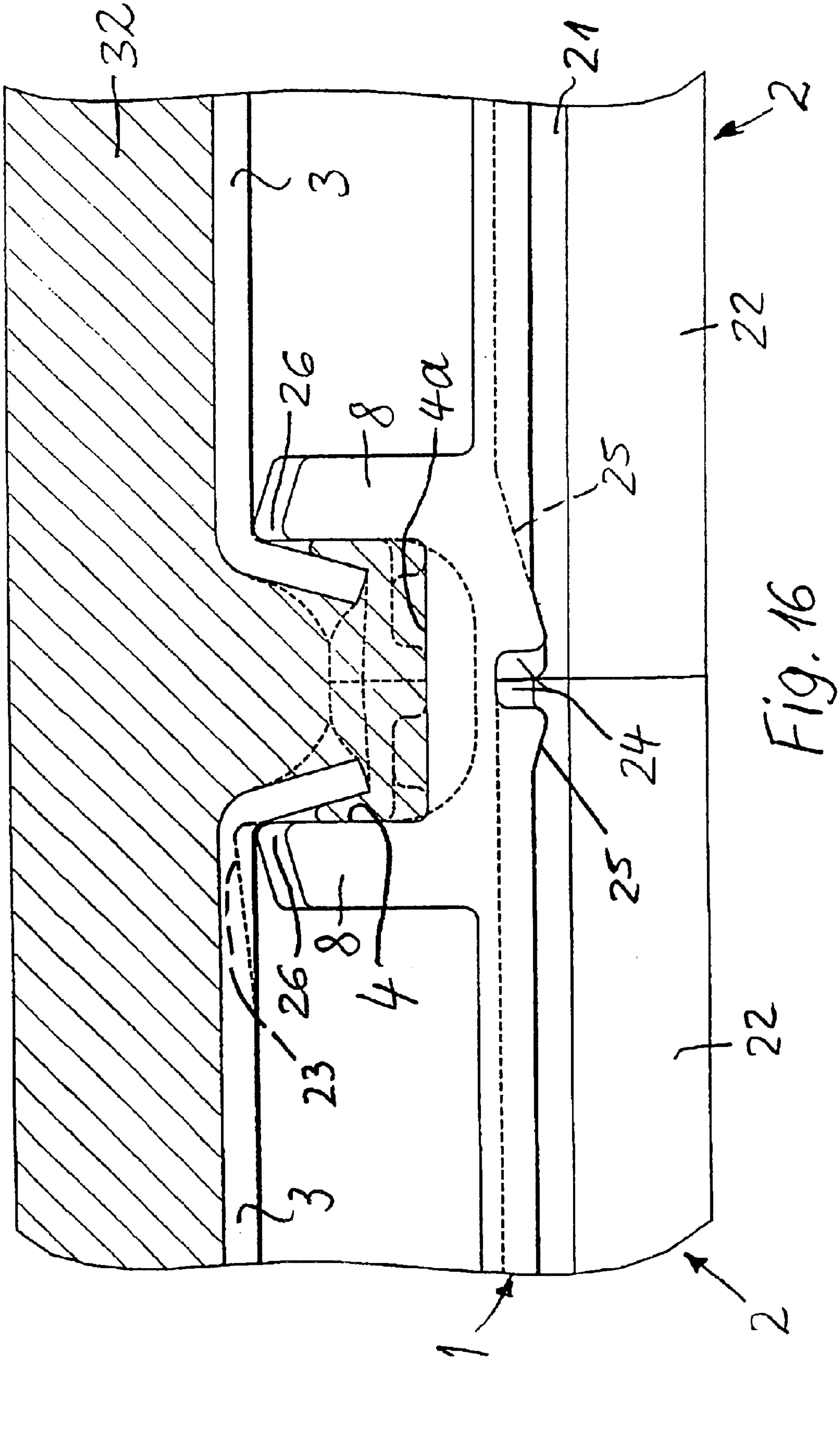
Figures 17, 18, 19, 20:
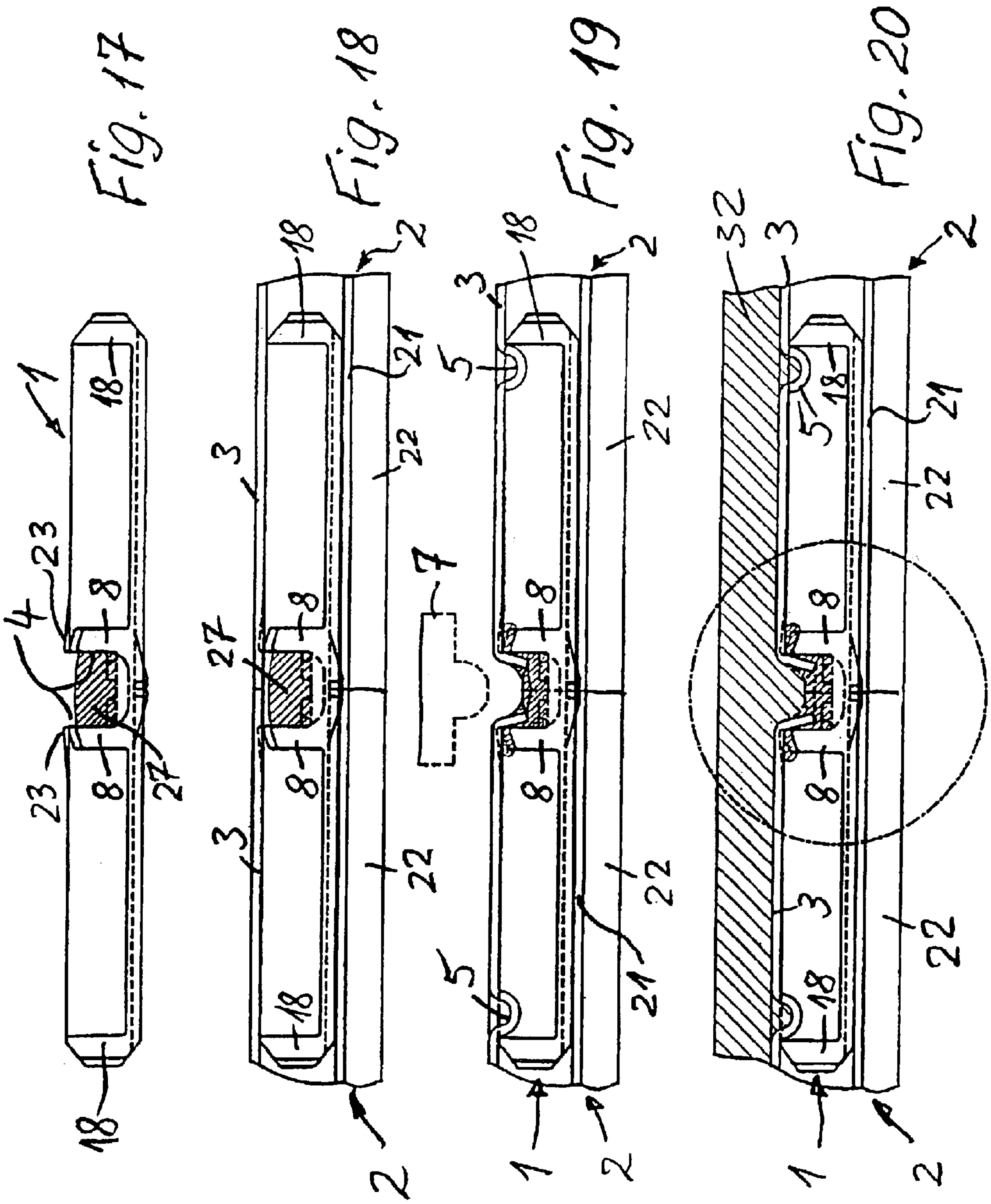
Figure 21:
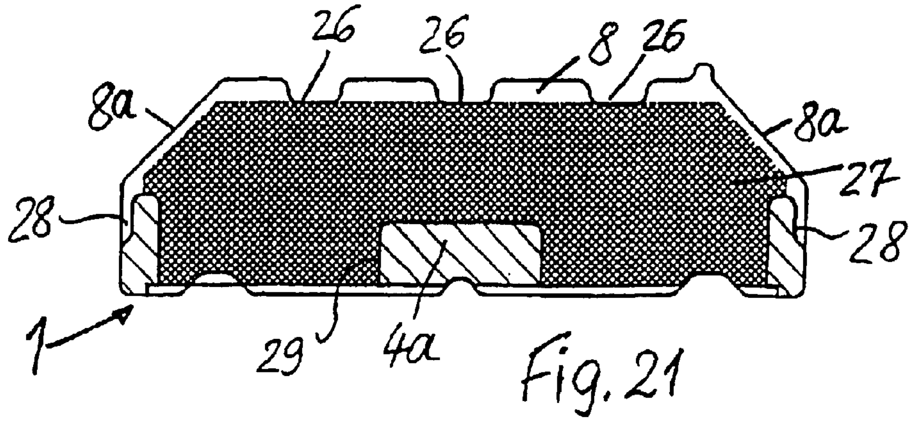
Figure 22:
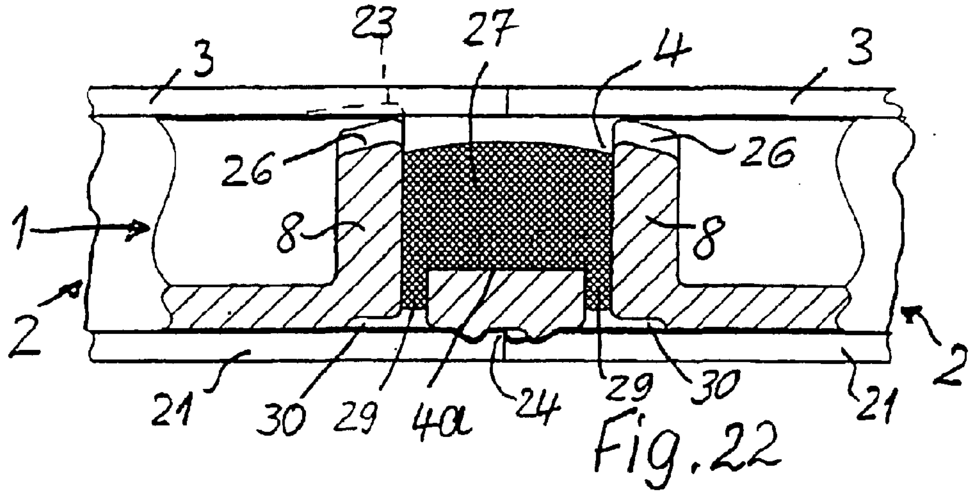
Figure 23:
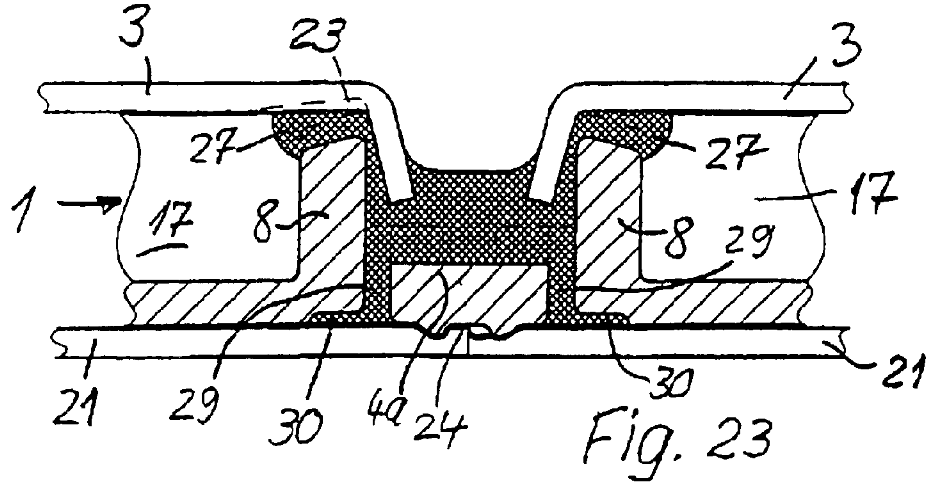
Figure 24:
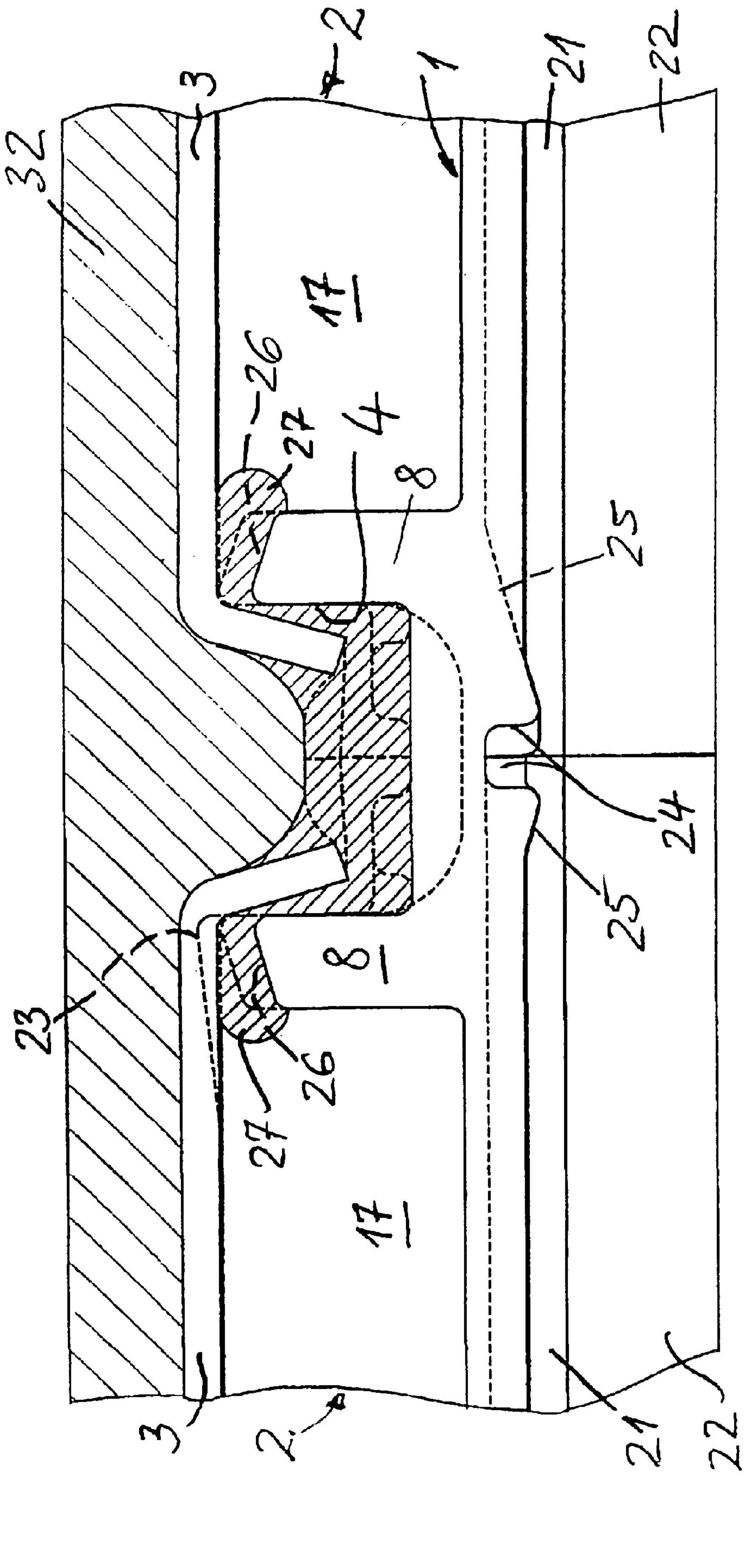
Figures 25, 26, 27:
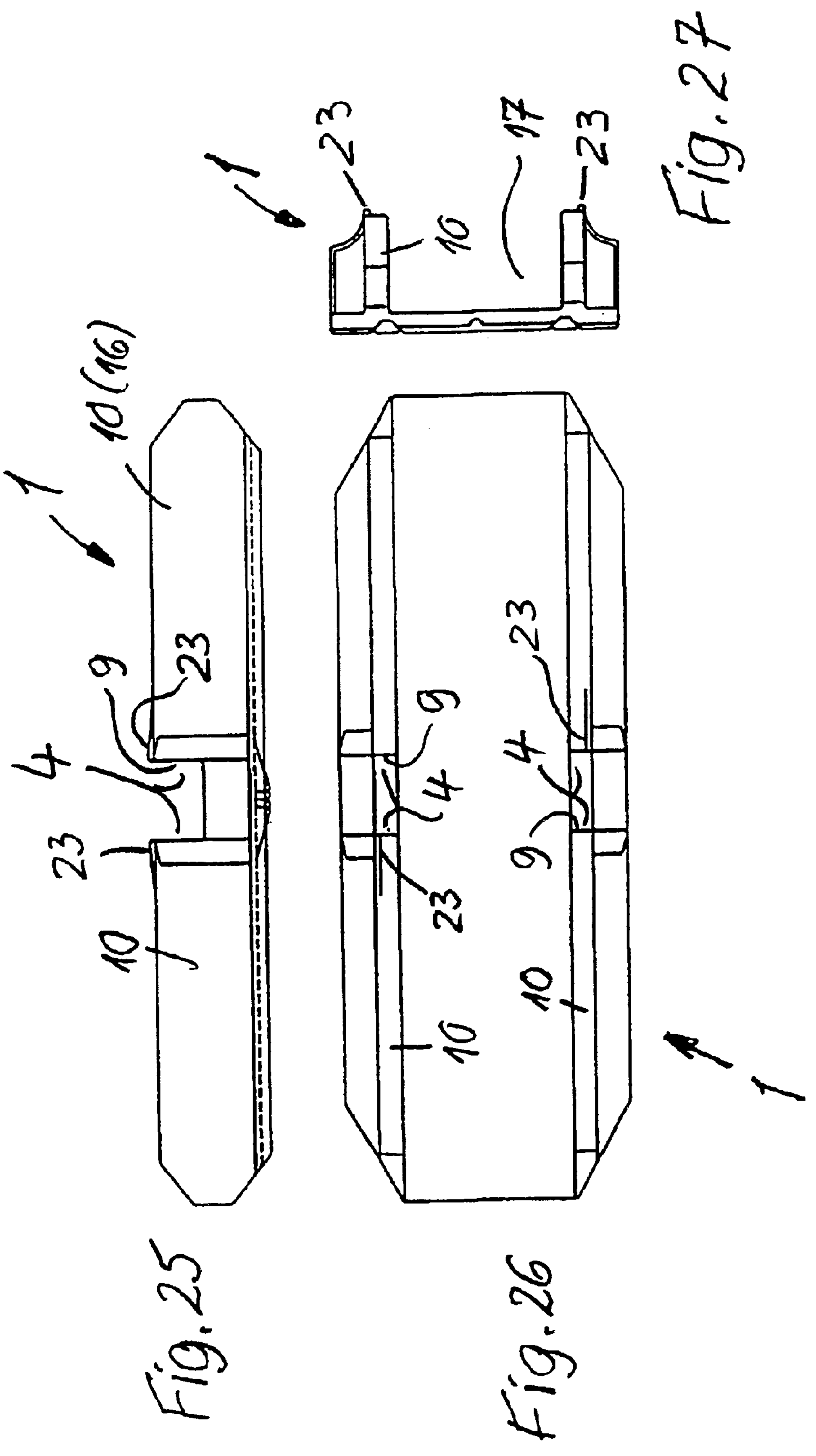
Figure 29:
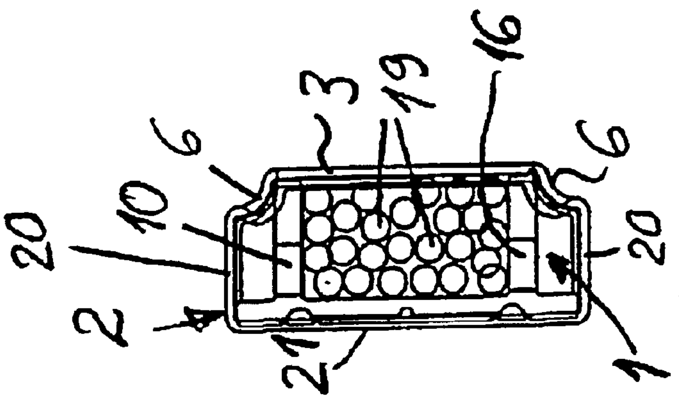
Figure 28:
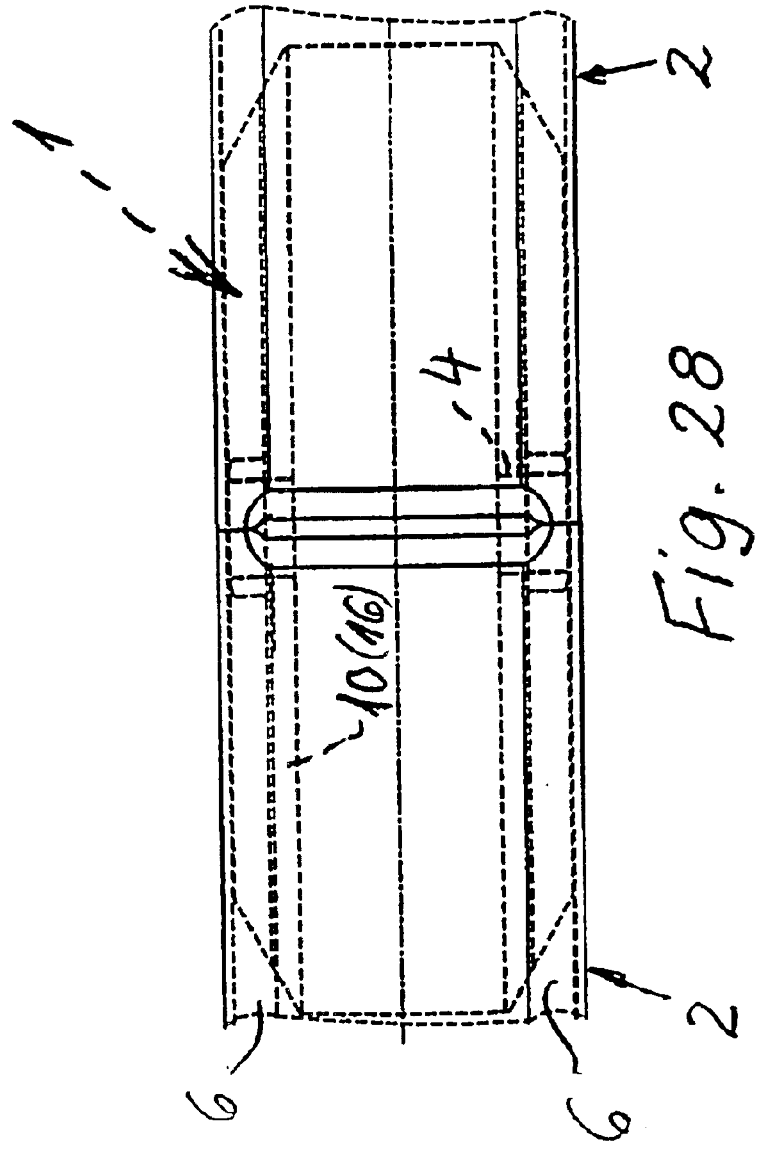
Figures 30, 31, 32:
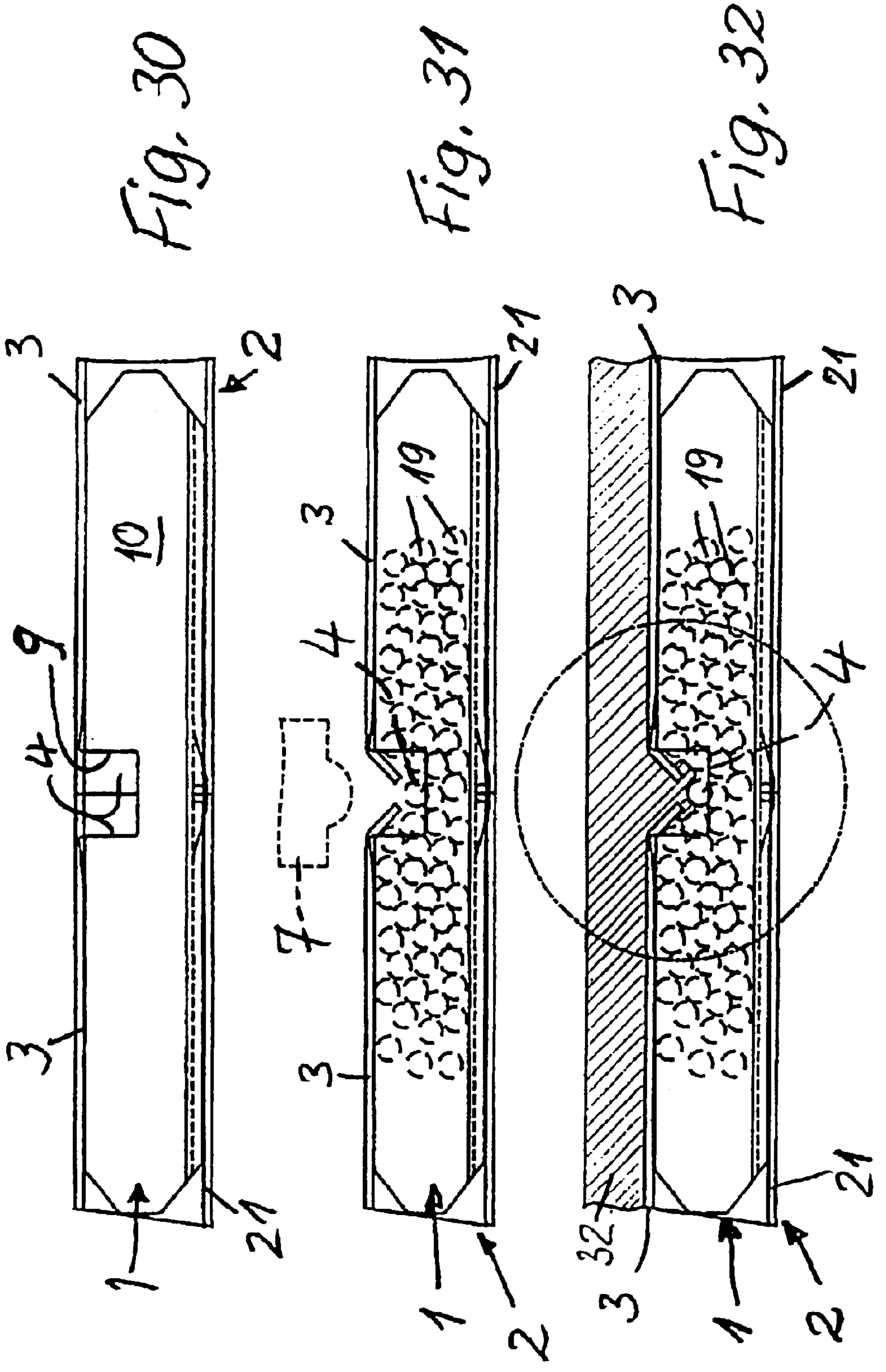
Figure 33:
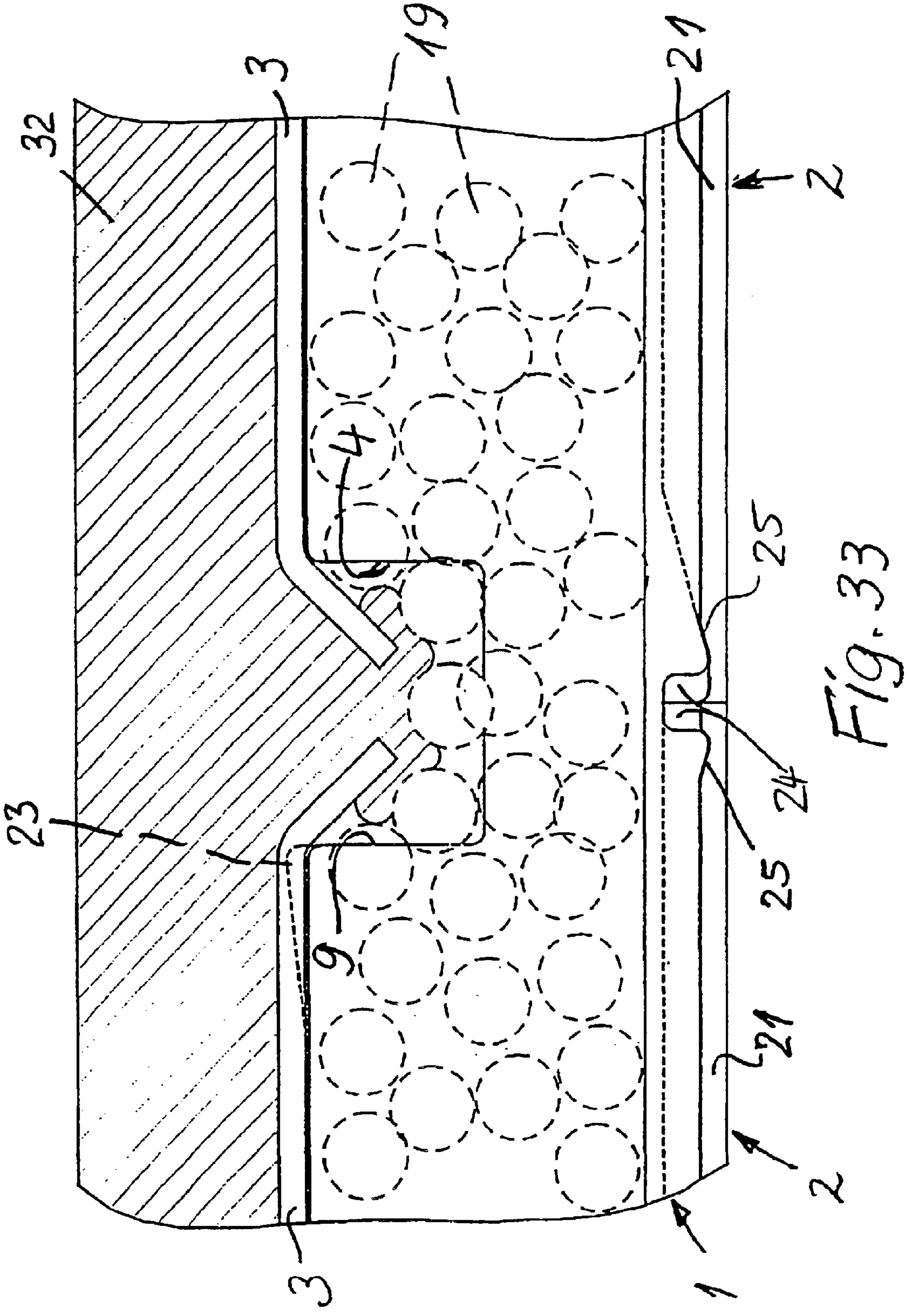
Figures 34, 35, 36, 37, 38:
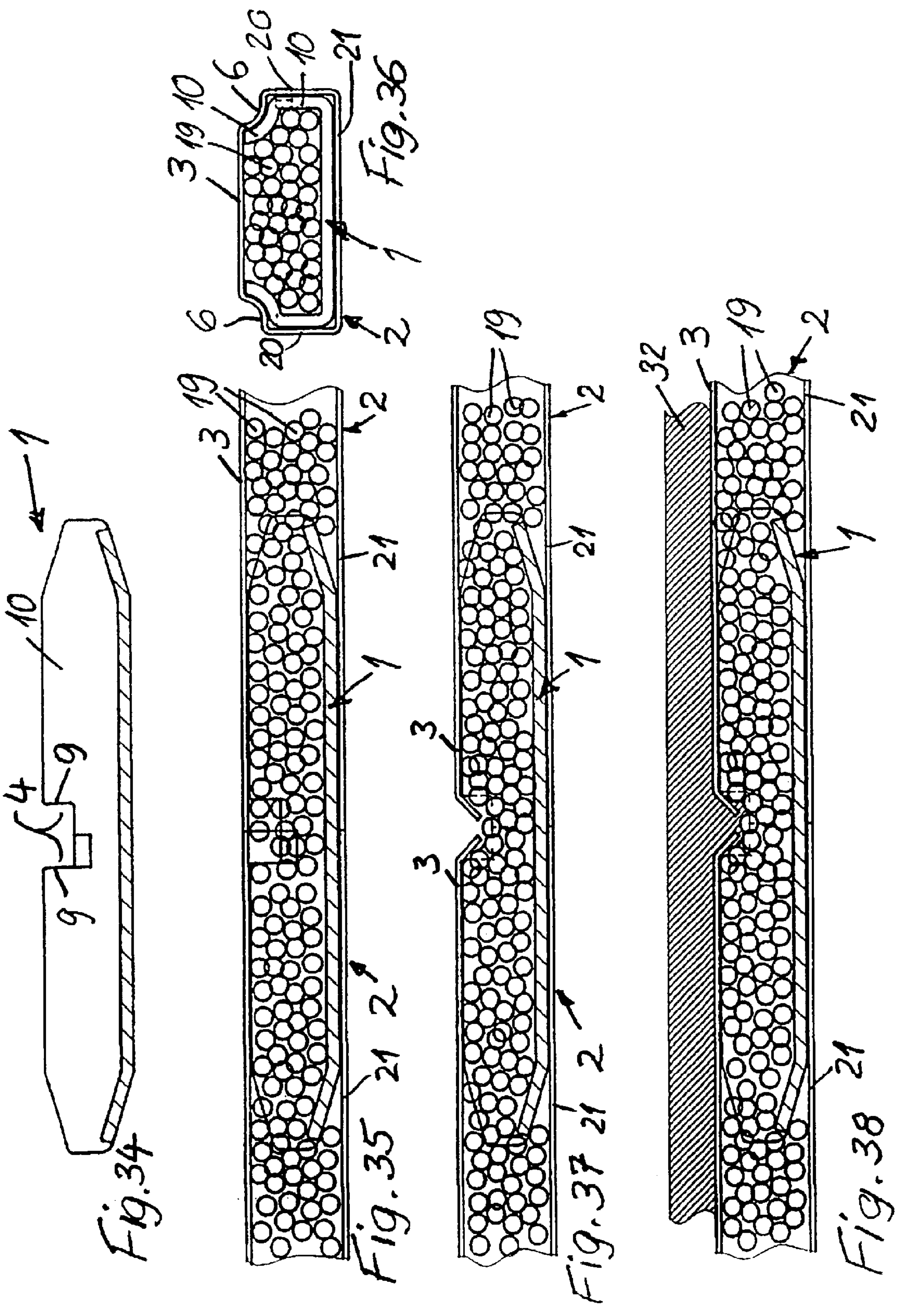
Figures 39, 40, 41, 42, 43:
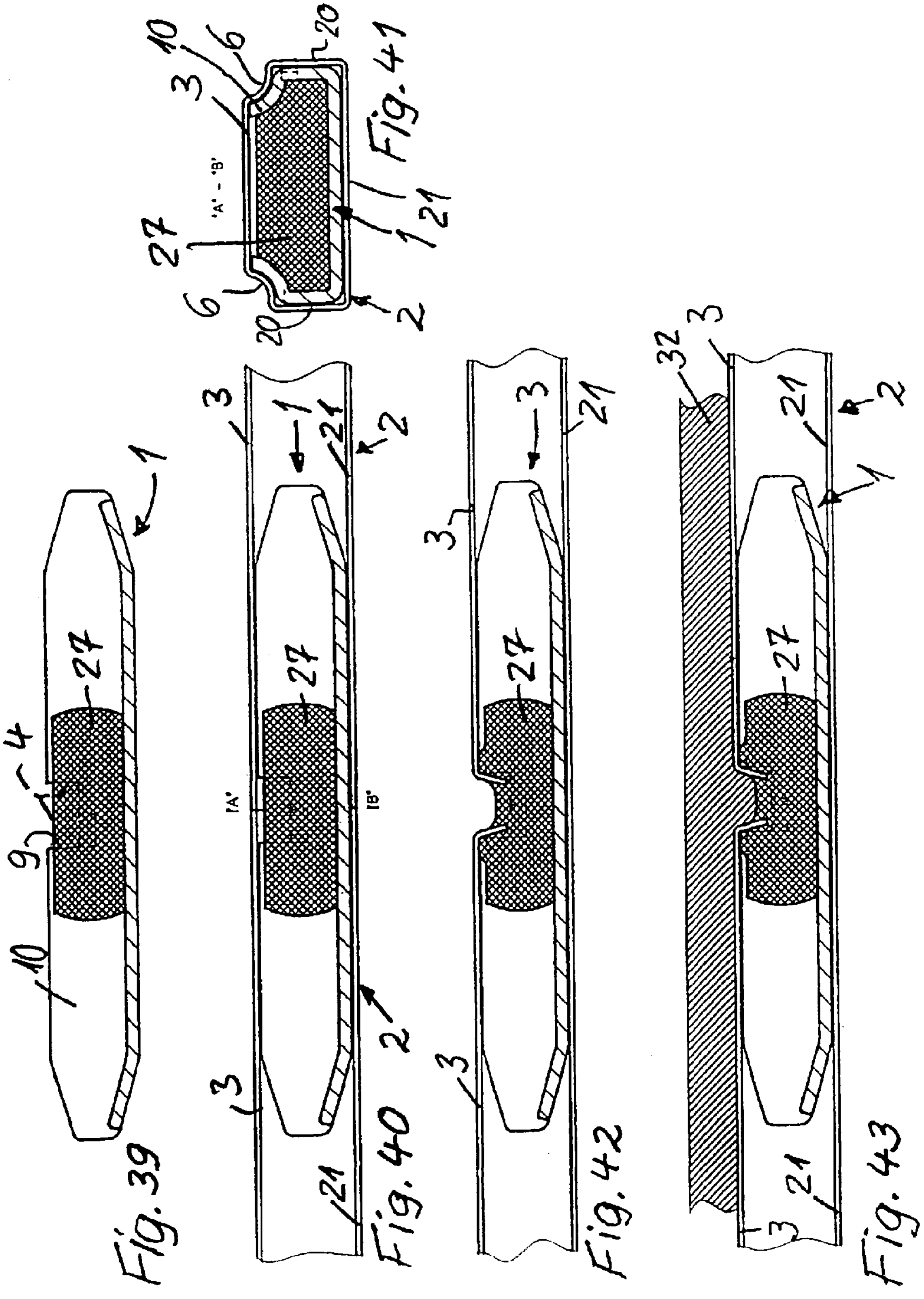
Figures 44, 45, 46, 47, 48:
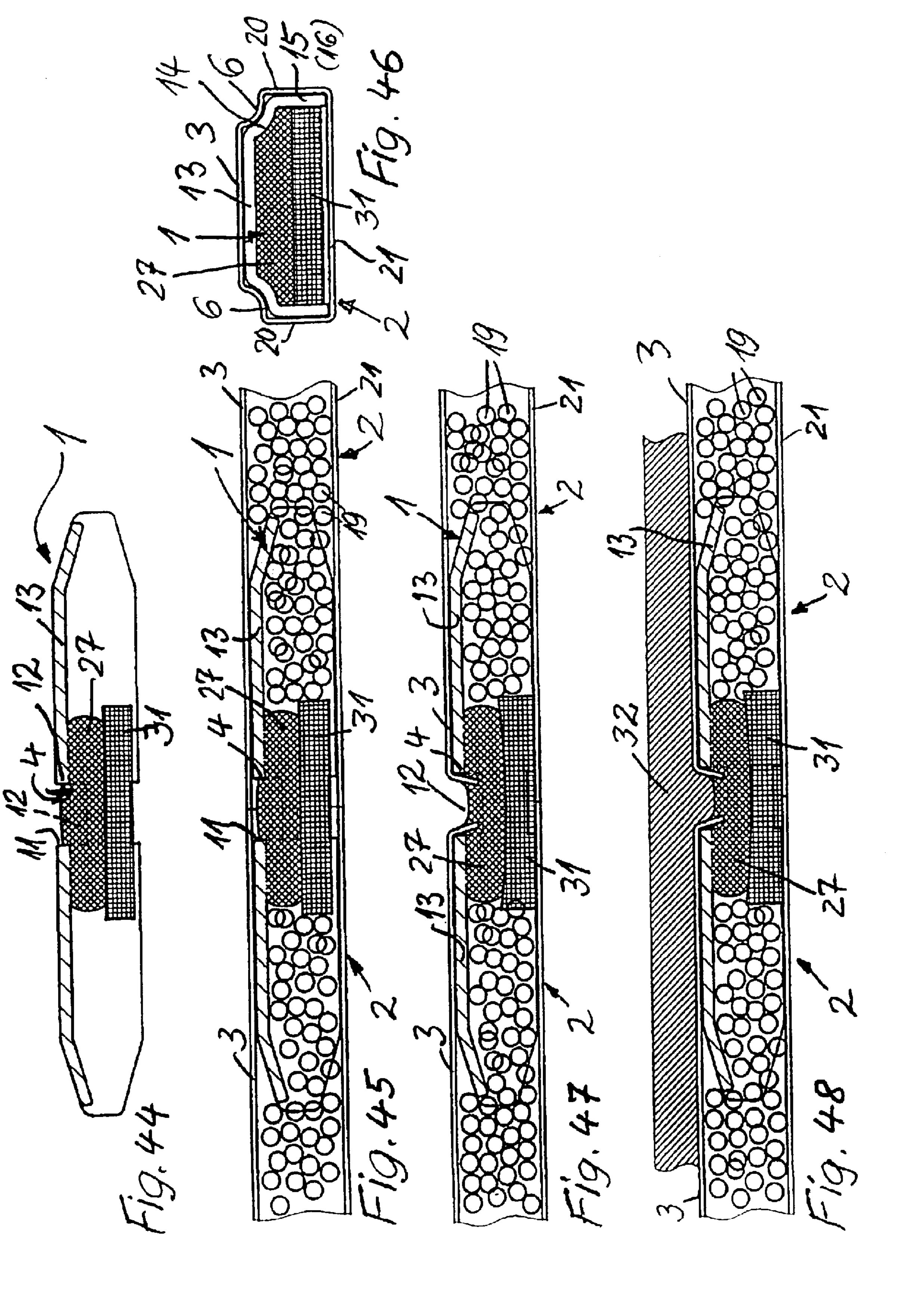

FIG. 3 is a view of the bottom of a straight connector according to the invention that fits into hollow profiles to be connected, with a recess located approximately in the center that extends across the entire width and that is bordered on both sides by steep walls and is open in its installed position to the back or to the outside of a spacer frame for insulating glass panes, so that the outside crosspieces of the hollow profile to be connected can be deformed into the recess inward and deep drawn, FIG. 4 is a cross section of the straight connector according along line A–B in FIG. 2 with a view of a wall that borders the recess and is provided on top with ventilation notches or openings, FIG. 5 is an end view of the straight connector, FIG. 6 is a cross section of the straight connector along line E–F in FIG. 2, FIG. 7 is another cross section of the straight connector along line G–H in FIG. 21, i.e. inside of the recess, with a view of one of the walls that border the recess, said wall being inclined at its two ends—also recognizable in FIG. 4—in order to fit into the inside cross section of the hollow profiles to be connected, FIG. 8 is a different end view of a straight connector in which the ends are closed, FIG. 9 is a top view of the points of abutment of two hollow profiles to be connected containing a straight connector according to FIG. 2 inside them, wherein the outside crosspiece of each of these hollow profiles is deformed inward and deep drawn in the area of the recess and thus at the point of contact of the two ends of the hollow profiles in the installed position, FIG. 10 is a cross section of the arrangement in FIG. 9 along line C–D in FIG. 9, containing the cross section of the hollow profiles to be connected and the sizing of the straight connector to fit the inner contour of the hollow profile, which has two continuation pieces that extend beyond an inner crosspiece in addition to the void, FIG. 11 is a cross section of the arrangement according to FIG. 9 along line A–B in FIG. 9, i.e. a cross section near the point of abutment of the two hollow profiles and of the recess of the straight connector located there after deformation of the areas of the hollow profiles to be connected that are adjacent to the point of abutment, FIG. 12 is a longitudinal section of the hollow profiles to be connected with the straight connector placed at the point of abutment after the profiles are pushed together, FIG. 13 is a representation according to FIG. 12 with a tool located above the point of abutment with which the outside pieces of the hollow profiles to be connected, which first are touching one another, are deformed inward into the recess of the straight connector, FIG. 14 is a representation after deformation and compression of the hollow profiles as in FIG. 13 with a straight connector as shown in FIGS. 1 through 7, i.e. a longitudinal section of the arrangement shown in FIG. 9, FIG. 15 is the detail identified with the circle in FIG. 14 in an enlarged scale with a view of ramps located at the top of the walls bordering the recess and of a bottom notch for the latching of the cutting ridge of the hollow profiles to be connected, as well as with a section through the ventilation openings or notches, FIG. 16 is a representation as in FIG. 15 after installing a seal that is attached to the outside or to the back of the hollow profiles, i.e. of the spacer frame made up of them, said seal sealing from the outside individual panes of an insulating window located on both sides of the spacer frame, FIG. 17 is a longitudinal section of a straight connector according to FIGS. 1 through 16, wherein prior to installation a plastically elastic sealant is placed into the recess, FIG. 18 is a longitudinal section of two hollow profiles to be connected and of a straight connector located inside of them according to FIG. 17, FIG. 19 is a representation of a straight connector as in FIG. 13 with a preliminary filling of plastically elastic sealant and a tool that deforms the outside crosspieces of the hollow profile to be connected inward into the recess when in the installed position, and deep draws them, thereby somewhat displacing the sealant located there, FIG. 20 is a representation as in FIG. 19 after the deformation of the crosspieces of the hollow profiles at the recess of the straight connector and after a subsequently added seal, wherein—as in FIG. 16—the panes of the insulating window located at the narrow sides of the hollow profiles or at the narrow sides of a spacer or spacer frame made up of them, are not visible, FIG. 21 is a cross section of a straight connector according to FIG. 17 in enlarged representation with a sealant inserted into the recess prior to the installation, FIG. 22 is a longitudinal section through the area of the recess, in an enlarged representation, of a straight connector according to FIG. 18 filled with a sealant here prior to the assembly, FIG. 23 is a longitudinal section of the straight connector in an enlarged scale and of the ends of two hollow profiles to be connected associated with it according to FIGS. 19 and 20, wherein the sealant is displaced in the longitudinal direction and through channels located at the bottom of the recess as a result of the deforming and deep drawing of the outside crosspieces near the recess, FIG. 24 is the detail identified with the circle in FIG. 20 in an enlarged scale, i.e. a longitudinal section through the connection of two hollow profiles with their ends facing one another and touching, said connection being facilitated by the straight connector according to the invention, after the deformation and deep drawing of the crosspieces of these hollow profiles that extend along the outside inward into the recess, by means of which sealant located there has been displaced, and after a seal is installed on the entire insulating window, wherein the seal material has penetrated into the void formed by the deep drawing of the crosspieces and has produced a relatively large seal thickness there analogous to FIG. 16, FIG. 25 is a longitudinal section, FIG. 26 is a top view, and FIG. 27 is an end view of a different straight connector in which the perpendicular recess is formed by an interruption of two longitudinal pieces that run in the longitudinal direction and that leave open a passage for desiccant between them, FIG. 28 is a top view of the connection point of two hollow profiles into each end of which a straight connector according to FIGS. 25 through 27 is inserted halfway, FIG. 29 is a cross section of the arrangement according to FIG. 28 with desiccant filled into the area of the connector as well, FIG. 30 is a longitudinal section of the two hollow profiles to be connected and that are in contact end-to-end and of the straight connector according to the invention that is inserted at this area as in FIGS. 25 through 29, FIG. 31 is the arrangement according to FIG. 30 and the tool with which the crosspieces of the hollow profiles are deformed inward and partially deep drawn by the tool at the recess or interruption in the longitudinal piece of the straight connector, FIG. 32 is the arrangement according to FIG. 31 after attaching a peripheral seal onto the outer crosspieces, FIG. 33 is the detail identified with the circle in FIG. 32 in an enlarged representation with the sealing material penetrated between the deep drawn crosspieces of the hollow profiles, wherein the opening formed between these deformed crosspieces of the hollow profile is smaller than the desiccant beads of the desiccant filling material, FIG. 34 is a longitudinal section of a straight connector made of sheet metal, wherein the section line runs through the U crosspiece facing the inside of an insulating window in the installed position, and wherein at the free ledges of the sides of the U is the recess that is located approximately in the center of the straight connector as a stamped cutout or recess, FIG. 35 is the arrangement of the straight connector according to FIG. 34 at the point of abutment of two hollow profiles to be connected, wherein at the same time a desiccant fill is indicated that can pass by the straight connector as well, FIG. 36 is a cross section of the arrangement according to FIG. 35 and of the U-shaped straight connector according to FIG. 34, wherein it can be seen that the sides of the U of this straight connector formed from sheet metal come together near their free ends, thus fitting into the transition pieces of the hollow profiles, FIG. 37 is a representation according to FIG. 35 after the deformation of the outside crosspieces of the hollow profiles to be connected that are located in the area of abutment FIG. 38 is a representation corresponding to FIG. 37 after installing a peripheral outside seal onto the insulating glass pane, FIG. 39 is a longitudinal section of a straight connector corresponding to FIG. 34, which is formed from sheet metal and has an approximately U-shaped cross section, wherein a plastically elastic sealant is provided at the recesses located at the sides of the U, FIG. 40 is a representation as in FIG. 35, but wherein the sealant blocks the passage of desiccant inside the straight connector so that desiccant can be fed only from the side up to this point of connection or the hollow profiles must be filled with desiccant already prior to their assembly, FIG. 41 is a cross section of the arrangement according to FIG. 40, along line A–B in FIG. 40, from which can be seen not just the fitting of the U-shaped straight connector to match the inner contour of the hollow profiles to be connected, but also the filling of its cross section with plastically elastic sealant can be seen, FIG. 42 is a representation as in FIG. 40 after the deformation and deep drawing of the outside crosspieces of the hollow profiles, FIG. 43 is a representation as in FIG. 42 after the seal is added to the outside of the hollow profiles at their point of connection, FIG. 44 is a longitudinal section of a different straight connector that has a U-shaped cross section and is formed from sheet metal, wherein its U crosspiece is located in its installed position at the outside or the back and wherein it contains the perpendicular recess, and wherein the sides of the U with their cross section are directed to the inside of a spacer frame containing this straight connector, FIG. 45 is a longitudinal section of the point of connection of two hollow profiles along with the straight connector according to FIG. 44 in this area, wherein desiccant is indicated on both sides of a sealant placed in the recess, FIG. 46 is a cross section of the point of connection according to FIG. 45 with a cross section of the straight connector made of sheet metal according to FIG. 44, FIG. 47 is a representation of the arrangement according to FIG. 45 after the deformation and deep drawing of the outside crosspieces of the hollow profiles to be connected inward into the recess provided at the back of the straight connector according to FIG. 44, FIG. 48 is a representation as in FIG. 45 after the seal is applied to the outside of the connected hollow profiles in the area of the deformed crosspieces, wherein the seal material has penetrated into the recess formed by the deep drawing of the crosspieces of the hollow profile.

DETAILED DESCRIPTION OF THE PREFERRED EMBODIMENTS

In the following explanation of the various exemplary embodiments of straight connectors and spacers or spacer frames manufactured using these straight connectors, parts with the same function are given the same reference numbers in different embodiments of the invention. Any features and measures that are not described in connection with all exemplary embodiments illustrated do however apply to them unless they are excluded as a result of the differences clarified in the above list of figures.

A straight connector, identified in the various embodiments in its entirety as 1 and constructed in these various embodiments according to the above list of Figures, is partially inserted, approximately half-way, into hollow profiles 2 that are connected together end-to-end according to FIGS. 9 through 20, 22 through 24, 28 through 33, 35 through 38, 40 through 43 and 45 through 48, respectively. The hollow profiles are used to build a spacer frame or to act as a spacer for insulated glass panes that are not shown in more detail, said arrangement being known from the prior art, for example in EP 0 133 655 B2 or EP 0 330 906 B1.

According to numerous Figures showing cross sections, for example FIG. 10, FIG. 29, FIG. 36 and FIG. 41, the cross section of the various straight connectors 1 fits into the inner hollow cross section of the respective hollow profiles 2 and fills them to a large extent at least in places, thus at least in places correspondingly. The straight connector 1 has a recess 4 at the center of its back facing the outer crosspiece 3 of the hollow profile 2 in its installed position into which adjacent ends of the outer crosspiece 3 of the hollow profile 2 can be deformed inward in a manner to be described in more detail later according to FIGS. 9, 11, 13 through 16, 19, 20, 23, 24, 28, 31 through 33, 37 and 38, 42 and 43 as well as 47 and 48. In the Figures mentioned, it can be seen that in this way, the hollow profile 2 and the straight connector 1 can be fixed with respect to one another, and this fixture can be strengthened through further deformations 5 (e.g. FIG. 19), if necessary. By thusly deforming the outer crosspieces 3 of the hollow profiles 2 to be connected into the recess 4 of the straight connector 1, the mutual connection of the ends of the hollow profiles 2 sought also results via this straight connector 1.

The detailed representation of the various straight connectors 1 in the various figures shows that the recess 4 runs across the entire width of the back of the respective straight connector 1 and opens up toward the outside crosspiece 3 in the installed position as well as toward the transition pieces 6 that connect to this crosspiece 3. In contrast to a recess that runs across only a portion of the width at the back of a straight connector 1, for example according to EP 0 133 655 B2 or DP 0 330 906 B1 or DE 32 43 692 A1, this recess 4, which penetrates across the entire width and that is open upward—toward the respective crosspiece 3—and also is open to the side, allows the crosspieces 3 to be deformed to an appropriate extent in the area where the hollow profiles 2 to be connected abut, said deformation also including the transition pieces 6.

The recess 4 is relatively narrow and has a variety of differently shaped steep borders so that the ends of the outside crosspieces 3 of the hollow profiles 2 to be connected that face one another are bent around sharp edges and plastically lengthened or deep drawn after they are deformed inward into the recess 4. In the figures already mentioned that show the deformed crosspieces 3, it can be clearly seen that they are bent by a clearly recognizable angle in comparison with the un-deformed shape of the crosspieces 3. On one hand this sharp-edged bend causes the deep draw effect in the process and on the other hand-so does the tool that is used to bend the respective parts of the crosspieces 3 and to force or squeeze them into the recess.

The sharp-edged steep borders of the recess 4 already mentioned are constructed differently depending on the particular exemplary embodiment.

In the exemplary embodiments according to FIGS. 1 through 24, the recess 4 is bordered by steep walls 8 that have relatively sharp edges at the sides facing one another, with the walls extending across the entire width of the straight connector 1 and thus providing a stable and stiff arrangement near the recess 4. Also, the bending and deforming of the crosspieces 3 is done practically across its entire width and also includes the transition pieces 6 since the walls 8 mentioned have matching inclines 8*a* at their ends that fit the cross sectional profile of the hollow profile 2—as already mentioned—for example according to FIG. 7. Spacer frames that utilize a straight connector 1 of this type must contain a desiccant, if it is to be filled with it, either already prior to the assembly with the straight connector 1 or else they must be filled with desiccant from one or both sides up to the straight connector 1.

In the straight connector 1 according to FIGS. 25 through 33, the recess 4 is bordered at the center of the straight connector 1 by steep sides 9 and pieces 10 that extend up to the recess and run in the longitudinal direction in which the connector extends, i.e. two parallel pieces 10 are interrupted at the center of the straight connector 1 and this interruption constitutes the recess 4, wherein the sharp-edged bending and deforming of the outside crosspieces 3 of the hollow profiles can be made at these pieces 10 at their point of interruption, as is shown in FIGS. 28 and 31, for example, and shown particularly clearly in FIG. 33. In this case, it is now only the pieces 10 near the recess 4 that form the corresponding seat for a deforming tool 7, but a similar deformation also results between the pieces 10 and to the side of them by using a continuous tool 7, said deformation leading to the desired deep draw process, mainly near the pieces 10. The effect of this—as in the exemplary embodiments already mentioned according to FIGS. 1 through 24—is that the two hollow profiles 2 are pulled together and their ends are pressed against one another solidly and fastened shape-locked at the straight connector 1.

In the exemplary embodiments according to FIGS. 34 through 38, the recess 4 is also bordered by steep sides 9 of the pieces 10 that lead up to it, wherein in this case the pieces 10 that run in the longitudinal direction of extension of the straight connector 1 are formed from the sides of a straight connector 1 with a U-shaped cross section, said piece being bent from sheet metal accordingly, for example, and can be chamfered, as is mainly shown both in FIGS. 34 and 36. The same applies for the embodiment according to FIGS. 39 through 43.

Another way to form the recess 4 and to provide it with relatively sharp edges and steep borders is accomplished in the exemplary embodiment according to FIGS. 44 through 48 in that the recess 4 is bordered by perpendicular leading edges 11 of an opening 12, said edges being located in this case in a crosspiece 13 of a U-shaped straight connector 1 whose crosspiece 13 constitutes the back, as is clearly seen in FIGS. 44 through 48. The crosspiece 13 is connected to the sides 15 of the U that face downward or inward in the case of an installed insulated glass pane, this connection being made likewise via transitions 14 analogous to the transition pieces 6 of the hollow profiles 2. This allows an opening 12 to be made in this U-crosspiece 13 that runs across its entire cross sectional width, said opening also incorporating or penetrating the transitions 14 so as to be able in this case as well to bend and deep draw the outside crosspieces 3 of the hollow profiles 2 according to FIGS. 47 and 48 at the leading edges 11 mentioned inward around the sharp edges.

In all of the exemplary embodiments, a tensile force can also be exerted at the same time on the hollow profiles 2 to be connected at the recess 4 of the straight connector 1, as a result of the deformation and deep draw process mentioned, which pulls together and fixes the ends of the hollow profiles so that a sealed abutment of the two hollow profiles 2 can be created in conjunction with a sealant to be applied in this area, said abutment also exhibiting a high rigidity.

The embodiments according to FIGS. 1 through 24 as well as 25 through 33 are straight connectors 1 that can be ideally manufactured from plastic or metal in an injection molding or die casting process. The other embodiments on the other hand, can ideally be bent from sheet metal but could also be injected parts.

On the one hand, in order to attain a high stability at the straight connector 1 in all of these cases so that it can best stabilize and stiffen the point of connection, but at the same time to save on weight, parallel side walls 16 (FIG. 1 and associated following views) can be provided that extend up to the recess 4, in particular in the center, said side walls bordering cavities 17 located on both sides of the recess 4. If these cavities 17 are open toward the back, i.e. toward the crosspieces 3 of the hollow profiles 2, as is the case for the embodiments according to FIG. 1 and associated following views and FIG. 25 and associated views as well as FIG. 34 and associated following views, the crosspieces 3 can, if necessary, also continue to be deformed inward near this recess 4, which can result in a further strengthening of the shape-fitted connection between the hollow profiles 2 and the straight connector 1, especially in conjunction with end blocks 18 according to FIG. 1 and associated following views, FIG. 13 and FIG. 14. If, as in the exemplary embodiments according to FIG. 25 and associated following views, end blocks 18 of this type are not present along with continuous walls 8 near the recess 4, the side walls 16 mentioned can be constituted or replaced by the pieces 10 running in the longitudinal direction.

In the embodiments according to FIG. 25 and associated following views, the cavities 17 also continue on into the recess 4 and form a straight channel, in particular at the back of the respective straight connector 1, that is closed off in the installed position by the hollow profile 2. However, this is also the case if, according to the exemplary embodiment according to FIGS. 44 through 48, the respective cavity 17, which is located between the side walls 16 or the sides 15 of the U that constitute these side walls, is located on the side of the straight connector 1 facing away from the back and open there. This closed channel opens up thus a pathway and passage for desiccant beads 19, as can be seen in FIGS. 31 through 33 and 35 through 38. This allows a hollow profile made up of a number of hollow profiles 2 using a straight connector 1 of this type to be filled with desiccant beads 19 prior to or after it is bent into the shape of a spacer frame, said desiccant beads then finding their way to all sections of such a hollow profile despite the presence of the straight connectors 1.

In the side views and longitudinal sections, for example in FIG. 1, FIGS. 12 through 14 and especially easy to see in the enlarged representations according to FIGS. 15 and 16, as well as in FIGS. 17 through 20 and in the enlarged representations according to FIGS. 22 through 24, but also in FIG. 25 and in FIGS. 30 through 33, and finally also in FIGS. 34 through 38 and also in FIGS. 39 through 43, it can be seen that the edge at the entrance to the recess 4 that forms the uppermost ledge on both sides of this recess 4 is approximately at right angles in the first figures mentioned, especially well recognizable in FIGS. 15 and 16 and in FIGS. 22 and 23, and even describes an acute angle, and that the borders of the recess 4 that face one another run parallel with respect to one another and at approximately a right angle with respect to the longitudinal direction in which the straight connector 1 extends. Inside the recess, its borders, i.e. the end faces 9 or the walls 8 or also the leading edges 11, are approximately parallel, whereas the top sides that lead up to the respective recess 4 are horizontal or at an inclined angle that in the direction toward the recess 4. A corresponding sharp bend can be made at the points of abutment of the outer crosspieces 3, incorporating the deep drawing effect mentioned.

Of most importance from the many different cross sections (see also the list of figures) it can be seen that the cross section of the straight connector is made to fit a hollow profile 2 having parallel side pieces 20 and two crosspieces at a distance from one another, namely the outer crosspiece 3 and an inner crosspiece 21, in which the somewhat inclined or convex or concave transition pieces 6, which were already mentioned, are provided between the outside crosspiece 3 and the side pieces 20 in the installed position. The depth of the recess 4 corresponds approximately to the cross sectional depth of the hollow profiles 2 that is traversed by the transition pieces 6 or exceeds it somewhat. This also allows the transition pieces 6 as well to be deformed and pulled somewhat inward and downward at the point of abutment during the deep drawing process. It should also be mentioned that the side pieces 20 can extend out beyond the inner crosspieces 21 via continuation pieces 22 (FIGS. 10 through 24), in order to form a correspondingly wide side surface for the panes of an insulation glass material to be held at a distance and sealed.

The width of the recess 4, i.e. its dimension in the direction in which the straight connector 1 extends, is approximately twice as large as its depth or somewhat larger so that the bent and deep drawn parts of the outer crosspiece 3 can find enough space and so that their ends end up sitting somewhat above the bottom 4*a* of the recess 4.

It can be seen in numerous figures, and especially well in FIGS. 15 and 16, that a ramp 23 is provided in the direction of flow of the respective hollow profile 2 just in front of the recess 4, said ramp ending at the entrance into the recess 4 and then dropping at an acute angle into the recess 4. This allows any play between the straight connector 1 and the hollow profile 2 to be removed.

It is further seen in numerous figures, and again especially well in FIGS. 15 and 16, that the straight connector has ramps 25 at its bottom side facing away from the recess 4 that run up to a center groove 24, wherein the groove 24 on the bottom can hold a cutting ridge at the ends of the hollow profiles 2 to be connected in the installed position, said cutting ridge even forming a latch in conjunction with this groove 24.

In FIGS. 2 and 3, it can be seen that in both the ramps 23 at the top and the ramps 25 on the bottom of the straight connector, whose respective inclines are in opposite directions, the ramps are laterally offset from one another with respect to the longitudinal centerline of the straight connector 1. This contributes to the alignment of the hollow profiles 2 to be connected and to the fitting of them so that their cross sections match one another.

In FIGS. 2, 6, 7, and 8, as well as in other figures, it can be seen that the walls 8 that border the recess 4 on both sides have at least one, and in the exemplary embodiment three, notches 26 or similar openings or recesses at their upper edges that run in the direction in which the straight connector 1 extends, with the notches forming a ventilation opening in conjunction with the respective hollow profile 2 placed thereupon when the ends of the outside pieces 3 are deformed and a sealant is displaced or subsequently filled. In this way, these notches 26 can then prevent air pockets from remaining inside the sealant that over time can lead to seal losses.

In numerous exemplary embodiments, namely in the exemplary embodiment according to FIGS. 17 through 24, in the exemplary embodiment according to FIGS. 39 through 43, as well as in the exemplary embodiment according to FIGS. 44 through 48, at least the recess 4 is filled, at least in areas, with a sealant 27 before the straight connector and the hollow profiles 2 are pushed together. The facing ledges of the outer crosspieces 3 of the hollow profiles 2 to be connected can be pressed inward into this sealant 27 during the deep drawing step, which leads to a corresponding displacement of the sealant 27, as is illustrated especially clearly in FIG. 23. In the process, it can be seen here how the sealant then also penetrates through the notches 26 and partially exits into the cavities 17, so that the area of the deep drawn ends of the crosspiece 3 and its surrounding area is sealed off from the inside with sealant. It can be seen above all in FIG. 21 that the recess 4 has a flat extension 28 at the narrow sides of the straight connector 1, into which sealant 27 can be moved and displaced from the center recess 4 out to the area of the side pieces 20 of the respective hollow profiles 2 when compressing the hollow profiles 2.

FIGS. 22 and 23 show that at least one channel 29 is provided at the bottom 4*a* of the recess 4 that leads underneath, and at least one flat depression 30 is provided at the bottom side into which the channel 29 feed so that when the sealant 27 is displaced, it also makes its way through the channel or channels 29 into this depression 30 on the bottom side and there further improves the seal between the straight connector 1 and the hollow profiles 2 from the inside, i.e. resulting in a secure seal mainly at the point of abutment of the hollow profiles 2. In the process, this depression 30 extends across the entire width of the straight connector 1 and can, if necessary, extend up to the sealant that is pressed into the flat lateral continuations 21.

As shown in FIGS. 1, 22, and 23, at least one channel 29 that leads to a depression 30 on the bottom side is provided at each foot of the walls 8 that border the recess 4 so that the sealant makes its way more or less symmetrically on both sides of the point of abutment of the hollow profiles 2 to the bottom side as well and thus to the inside of the inside crosspieces 21 of the hollow profiles 2 when they are compressed together.

The various exemplary embodiments of the straight connector 1 allow different manufacturing methods to be used, but in each case resulting in a straight connector 1 at which the ends of the outer crosspieces 3 that face one another can be deformed inward and deep drawn in an advantageous manner in order to then more strongly pull together and fasten the two hollow profiles 2 to be connected. For example, the straight connector 1 can be made of metal or die-cast or of hard plastic where the exemplary embodiments according to FIGS. 1 through 33 are concerned. However, it can also be made of a bent sheet metal part as shown in FIGS. 34 through 48 and which will be explained in more detail below.

According to FIGS. 34 through 38, and in particular according to FIG. 36, the straight connector 1 formed as a sheet metal part has an approximately U-shaped cross section that is likewise matched to fit the inside cross section of the hollow profile 2, i.e. also taking into account the transition pieces 6. In the process, the sides of the U in this exemplary embodiment contain the recess 4 at their ends that is fitted to the transition pieces 6 so that this straight connector 1 can also allow the flow of desiccant 19. Furthermore, the area of the recess 4 according to FIGS. 39 through 43 can likewise be filled with sealant 27 in this type of straight connector 1, wit thee sealant being somewhat displaced inward into the recess 4 (FIGS. 42 and 43) when deforming the ends of the crosspieces 3 of the hollow profiles 2 that face one another and thereby improving the seal. In this case, desiccant must be filled in from either side or must already be present in advance in the hollow profiles 2 into which this straight connector 1 is then inserted from the end.

FIGS. 44 through 48 shows an exemplary embodiment in which the straight connector 1, which is formed as a sheet metal part, also has a U-shaped cross section that also is matched to fit the inner cross section of the hollow profile 2 and also its transition pieces 6, as already mentioned, wherein the crosspiece 13 of the U has the recess that for example is stamped out of it. On the side facing away from the recess 4 and the crosspiece 13 of the U, the U-cross section is filled in with a gasket 31, for example a foam seal, between its U-sides 15 in an area that extends beyond the recess 4 to both sides in the longitudinal direction of extension, and by a plastically elastic sealant 27 located between the U-crosspiece 13 and the gasket 31, said plastically elastic sealant in turn being displaced inward into the recess 4 when the ends of the outside crosspieces 3 of the hollow profiles 2 are deformed, improving the seal-tightness. From this, it can be seen how desiccant can be filled in up to this sealed area of the recess 4 from both sides.

The process to connect the ends of two hollow profiles 2 using one of the straight connectors 1 described above, which can be inserted or pushed into the ends of the hollow profiles to be connected, approximately half-way into each one, is done quite similarly in all cases. After pushing the hollow profiles 2 onto the straight connector 1 or vice versa after inserting the straight connector 1 into the ends of the hollow profiles 2 to be connected, the outsides of these profiles are deformed and compressed together such that a shape lock arises with the straight connector 1. This occurs in the exemplary embodiments illustrated by crosspieces 3 of the hollow profiles to be connected that constitute the outer sides of the hollow profiles 2 being deformed at their ends inward and pressed into a recess 4 that runs across the entire width of the straight connector 1, the crosspieces thereby being somewhat lengthened or deep drawn as well in their zone of deformation. This is thus not just a minimal amount of inward buckling, but is a considerable deformation that also deforms some of the transition areas or transition pieces 6 somewhat as well due to the recess that extends across the entire width, so that an outward bulging at the side surfaces is prevented. This provides a correspondingly good sealing of the glass panes that are to be laid against the side pieces 21—with their continuation pieces 22.

The ledges or ends of the crosspieces 3 of the hollow profiles 2 to be connected that face one another are bent around sharp edges at the ledge of the recess 4 and thus deep drawn. The areas of the crosspieces 3 to be deformed are each bent around the walls 8 or end faces 9 of pieces 10 that lead up to the recesses 4, and deep drawn at their ledge areas, i.e. they bend around those parts or areas that laterally border a channel that runs at the outside of the straight connector 1 and forms the recess 4.

It is especially favorable if the ledges of the outside crosspieces 3 of the hollow profiles 2 to be connected that face one another are bent and deep drawn around walls 8, or their leading edges, that border the recess 4 on both sides and that run across the entire width, as has already been explained with the corresponding figures and has been illustrated in them.

In the process, the ends of the outside crosspieces 3 that face one another can be pressed into a sealant 27 located in the recess 4 during deep drawing and the sealant 27 can be thus displaced behind the bent areas of the crosspieces 3 and/or between the straight connector 1 and the side pieces 20 or between it and the inner crosspiece 21 of the hollow profile 2 facing away from the deformation.

In the exemplary embodiments already described above in which desiccant beads 19 can also be filled in through the connection area, the beads are thus able to pass by the straight connector 1 designed accordingly, for example according to FIGS. 25 through 27. The ends of the crosspieces 3 can be deep drawn far enough that the distance resulting and/or remaining between them is small and in particular smaller than the dimension of the desiccant beads 19 filled or to be filled, so that they cannot, as a result of deep drawing, exit at the opening resulting between the crosspieces of the hollow profiles to be connected.

Many exemplary embodiments also show that a seal layer 32 can be applied to the outside of the hollow profiles 2 after compression together with the straight connector 1, either prior to or after the application of a sealant, said seal layer partially penetrating into the opening arising between the deep drawn parts of the crosspieces 3, thus producing a correspondingly large layer thickness at this point, which must be sealed particularly well so that the thickness of this seal layer 32 can be kept to a minimum at the remaining areas. Thus, it is advantageous for the seal that an inwardly directed recess results from the deep drawing of the ends of the crosspieces 3 of the hollow profiles 2 to be connected that face one another, with the deep drawing being done at the outside of a spacer or spacer frame so manufactured, since at this point the seal material 32 then has a correspondingly large thickness through which air or moisture can no longer pass.

This seal layer 32 can penetrate either directly into the respective opening and also into the recess 4 of the straight connector 1, as is illustrated in FIG. 16, or it can also cooperated with a sealant 27 that is present there already, as is shown in FIG. 24 or FIG. 48, for example.

Overall, a straight connector 1 results, that facilitates a deformation and compression of the ends of the outer crosspiece 3 of the hollow profiles 2 to be connected, thanks to the deep recess 4 that extends across the entire width, with its associated sharp edges, wherein the transition pieces 6 can also be pulled along with into this recess 4 so that an outward bulging of the side pieces 20 can be prevented, said outward bulging being a reaction to the bending of the crosspiece 3 inward. At the same time, the ends of the hollow profiles to be connected are drawn together as a result of the deep drawing process, i.e. they are pressed against one another and sealed airtight in conjunction with the displaced sealant or subsequently injected sealant and/or seal material. A very simple straight connector 1 thus permits a considerable improvement of the point of abutment of the two hollow profiles 2 to be connected.

The straight connector 1 is partially inserted, preferably half-way into hollow profiles 2 that are open at their ends and are to be connected together end-to-end there. The profiles are used to form a spacer frame or spacer for insulated glass panes. The cross section of the straight connector 1 fits into the inner hollow cross section of the hollow profile 2 and is designed and contoured according to this hollow cross section at least in areas in order to also support and stiffen the hollow profile 2 near the point of abutment from the inside. At its back that faces the outer crosspiece 3 of the hollow profile 2 in the installed position, the straight connector 1 has in its center a recess 4 that extends across both sides of the point of abutment of the hollow profile 2, into which the ends of the outer crosspiece 3 of the hollow profile 2 that face one another can be deformed inwardly. In the process, the recess 4 is bordered either along its entire length on both sides by walls 8 across the entire width of the straight connector 1, or only by the ends of longitudinal pieces or by ledges of an opening so that the outside crosspieces 3 of the hollow profiles 2 can be deformed and deep drawn inward into this recess 4 at corresponding sharp-edged borders, with transition pieces 6 present at the hollow profiles 2 also being deformed inward into this recess 4 along with so as to prevent buckling or outward bulging at the side pieces 20 of the hollow profiles 2.

What is claimed is:

1. A straight connector (1) adapted to be partially inserted, approximately half-way, into hollow profiles (2) that are connected together end-to-end, said hollow profiles being used to form a spacer frame or spacer for insulated glass panes, the straight connector (1) defining a cross-section adapted to fit into an inner hollow section of the hollow profile (2), the straight connector (1) comprising:

a centered recess (4) on a back of the connector, adapted to face an outer crosspiece (3) of the hollow profile (2) in an installed position, into which ends of the outer crosspiece (3) of the hollow profile (2) that face each other can be deformed inwardly, wherein the recess (4) extends across an entire width at the back of the straight connector (1) and is adapted to be open toward the outer crosspiece (3) of the hollow profile (2) in its installed position, the recess (4) being narrow and having borders which include steep sides (9) of pieces (10) that lead up to the recess or steep walls (8) or perpendicular leading edges (11) of an opening (12);

parallel side walls (16) that extend up to the recess (4), located on both sides of the recess (4); and cavities (17), bordered by the parallel side walls (16), which continue on into the recess (4) and form a continuous channel at the back of the straight connector (1) that is adapted to be closed in the installed position by the hollow profile (2), the cavities and the recess having a greater depth than a depth which corresponds to an inward extension of the deformed crosspieces (3) at the ends of the hollow profiles (2).

2. The straight connector according to claim 1, wherein an edge at an entrance to the recess (4) is approximately at a right angle or an acute angle, and the borders of the recess (4) face one another and run parallel with respect to one another and at approximately a right angle with respect to a longitudinal direction in which the straight connector (1) extends.

3. The straight connector according to claim 1, wherein the cross section adapted to fit the hollow profile (2), which includes parallel side pieces (20) and two crosspieces (3, 21), including the outer crosspiece (3), spaced at a distance from one another, and transition pieces (6) that are somewhat inclined, convex or concave in cross section, which are provided between the outer crosspiece (3) and each side piece (20) in the installed position, wherein the recess (4) has a depth that corresponds approximately to or exceeds a cross sectional depth of the hollow profiles (2) that is traversed by the transition pieces (6).

4. The straight connector according to claim 1, wherein a width of the recess (4) in a longitudinal direction of extension of the straight connector (1) is approximately twice as large as a depth thereof.

5. The straight connector according to claim 1, further comprising at least one ramp (23) positioned parallel to a direction of insertion into the respective hollow profile (2) adjacent to the recess (4), said ramp ending at an entrance into the recess (4) and dropping at an acute angle into the recess (4).

6. The straight connector according to claim 1, wherein the steep sides (9) that border the recess on both sides have at least one notch (26) opening at an upper ledge thereof that extends in a longitudinal direction of extension of the straight connector (1), said notch forming a ventilation opening in conjunction with the hollow profile (2) placed thereon.

7. The straight connector according to claim 1, wherein at least the recess (4) is filled with a sealant (27) adapted to contact ledges of the outer crosspieces (3) of the hollow profiles (2).

8. The straight connector according to claim 7, wherein the recess (4) has a flat extension (28) at narrow sides of the straight connector (1) into which sealant (27) can move, during assembly with the hollow profiles (2), from the center recess (4) to an area of side pieces (20) of the hollow profiles (2), at least when the hollow profiles (2) are compressed together.

9. The straight connector according to claim 1, further comprising at least one channel (29) leading to a bottom side at a bottom **(4*a*) of the recess (4) which feeds into a flat crevasse (30)**.

10. The straight connector according to claim 9, wherein the crevasse (30) extends across an entire width of the straight connector (1).

11. The straight connector according to claim 1, wherein at least one channel (29) is provided within the recess at each foot of the walls (8) that border the recess (4), said channel leading to a bottom-side crevasse (30).

12. The straight connector according to claim 1, wherein the straight connector is made of metal, die cast material, hard plastic, or a stamped and bent sheet metal part.

13. The straight connector according to claim 1, wherein the straight connector is made of sheet metal and has a U-shaped cross section that is adapted to fit into an inside the hollow profile (2) and a U-crosspiece (13) which contains the recess (4) stamped out of the U-crosspiece (13).

14. A straight connector (1) adapted to be partially inserted, approximately half-way, into hollow profiles (2) that are connected together end-to-end, said hollow profiles being used to form a spacer frame or spacer for insulated glass panes, the straight connector (1) defining a cross-section adapted to fit into an inner hollow section of the hollow profile (2), the straight connector (1) comprising:

a centered recess (4) on a back of the connector, adapted to face an outer crosspiece (3) of the hollow profile (2) in an installed position, into which ends of the outer crosspiece (3) of the hollow profile (2) that face each other can be deformed inwardly, wherein the recess (4) extends across an entire width at the back of the straight connector (1) and is adapted to be open toward the outer crosspiece (3) of the hollow profile (2) in its installed position, the recess (4) being narrow and having borders which include steer sides (9) of nieces (10) that lead up to the recess or steep walls (8) or perpendicular leading edges (11) of an opening (12); and ramps (25) provided on a bottom facing away from the recess (4), said ramps extending up to a center groove (24), the bottom center groove (24) being adapted to retain a cutting ridge present at the ends of the hollow profiles (2) in an installed position.

15. The straight connector according to claim 14, wherein parallel side walls (16) are provided that extend up to the recess (4), which is located in the center, that border cavities (17) located on both sides of the recess (4).

16. The straight connector according to claim 14, further comprising at least one ramp (23) provided in a direction of insertion into the respective hollow profile (2) adjacent to the recess (4), said at least one ramp (23) ending at an entrance into the recess (4) and dropping at an acute angle into the recess (4), and wherein the ramps (23, 25) at the top and/or the bottom, include respective inclines in opposite directions, and are laterally offset from one another with respect to a longitudinal centerline of the straight connector (1).

17. A straight connector (1) adapted to be partially inserted, approximately half-way, into hollow profiles (2) that are connected together end-to-end, said hollow profiles being used to form a spacer frame or spacer for insulated glass panes, the straight connector (1) being made of sheet metal and defining a U-shaped cross-section adapted to fit into an inner hollow section of the hollow profile (2), the straight connector (1) comprising:

a U-crosspiece (13);

a centered recess (4) on a back of the connector, which is stamped out of the U-crosspiece (13), adapted to face an outer crosspiece (3) of the hollow profile (2) in an installed position, into which ends of the outer crosspiece (3) of the hollow profile (2) that face each other can be deformed inwardly, wherein the recess (4) extends across an entire width at the back of the straight connector (1) and is adapted to be open toward the outer crosspiece (3) of the hollow profile (2) in its installed position, the recess (4) being narrow and having borders which include steep sides (9) of pieces (10) that lead up to the recess or steep walls (8) or perpendicular leading edges (11) of an opening (12); and a gasket (31) between sides (15) of the connector (1), on a side facing away from the recess (4), at least in an area that extends beyond the recess (4) toward adjacent sides of the recess.

* * * * *